(12) United States Patent
Koch

(10) Patent No.: US 8,241,390 B2
(45) Date of Patent: Aug. 14, 2012

(54) SEMI-LIQUID METAL PROCESSING AND SENSING DEVICE AND METHOD OF USING SAME

(75) Inventor: Alan A. Koch, Warren, OH (US)

(73) Assignee: Ajax Tocco Magnethermic Corporation, Warren, OH (US)

( * ) Notice: Subject to any disclaimer, the term of this patent is extended or adjusted under 35 U.S.C. 154(b) by 99 days.

(21) Appl. No.: 12/680,652

(22) PCT Filed: Oct. 10, 2008

(86) PCT No.: PCT/US2008/079465
§ 371 (c)(1),
(2), (4) Date: Jun. 8, 2010

(87) PCT Pub. No.: WO2009/049118
PCT Pub. Date: Apr. 16, 2009

(65) Prior Publication Data
US 2010/0251854 A1    Oct. 7, 2010

Related U.S. Application Data

(60) Provisional application No. 60/979,511, filed on Oct. 12, 2007.

(51) Int. Cl.
*C22B 9/22* (2006.01)
*C22B 21/06* (2006.01)

(52) U.S. Cl. .......... 75/10.15; 75/10.67; 75/375; 75/382; 75/386

(58) Field of Classification Search ................ 75/10.15, 75/375, 382, 386, 686, 10.67
See application file for complete search history.

(56) References Cited

U.S. PATENT DOCUMENTS

| | | | |
|---|---|---|---|
| 4,434,837 A | 3/1984 | Winter | |
| 5,219,018 A | 6/1993 | Meyer | |
| 5,925,199 A * | 7/1999 | Shiina et al. | 148/538 |
| 6,399,017 B1 | 6/2002 | Norville | |
| 6,402,367 B1 | 6/2002 | Lu | |
| 6,432,160 B1 | 8/2002 | Norville | |
| 6,443,216 B1 | 9/2002 | Lombard | |
| 6,637,927 B2 | 10/2003 | Lu | |
| 6,796,362 B2 | 9/2004 | Lombard | |
| 6,796,363 B2 | 9/2004 | Arai | |
| 6,932,938 B2 | 8/2005 | Norville | |
| 6,991,970 B2 | 1/2006 | Fogal | |
| 7,132,077 B2 | 11/2006 | Norville | |
| 7,168,350 B1 | 1/2007 | Hsieh | |
| 7,169,350 B2 | 1/2007 | Norville | |
| 7,216,690 B2 | 5/2007 | Han | |
| 2002/0085614 A1* | 7/2002 | Tsuda et al. | 373/151 |
| 2007/0137827 A1* | 6/2007 | Vogt et al. | 164/113 |
| 2007/0187060 A1 | 8/2007 | Han | |
| 2008/0063025 A1* | 3/2008 | Fishman et al. | 373/144 |

* cited by examiner

*Primary Examiner* — George Wyszomierski
*Assistant Examiner* — Tima M McGuthry Banks
(74) *Attorney, Agent, or Firm* — Fay Sharpe LLP; Brian E. Turung

(57) ABSTRACT

A semi-liquid metal processing and sensing device comprising a crucible that is at least partially encircled by at least one induction coil. The one or more induction coils can be water cooled. The one or more induction coils can be designed to generate a variable power and/or variable frequency magnetic field which can be modulated to control the cooling of a molten metal charge in the crucible from the liquidus temperature to a selected heat content, resistivity and/or viscosity. The magnetic field can be designed to induce toroidal agitation of the metal charge in the crucible. The semi-liquid condition is sensed and can be actively controlled by the induction power supply via real time or non-real time analysis of electrical feedback signals that are obtained from the induction coil.

34 Claims, 12 Drawing Sheets

SEMI-LIQUID METAL PROCESSING AND SENSING DEVICE AND METHOD OF USING SAME

The present invention claims priority on International Application No. PCT/US2008/079465 filed Oct. 10, 2008, which in turn claims priority on U.S. Provisional Patent Application Ser. No. 60/979,511 filed Oct. 12, 2007, which is incorporated in its entirety by reference herein.

The invention relates generally to a device and method for processing molten and/or semi-molten metal; particularly to a device and method for at least partially monitoring and/or controlling the heating, cooling, and/or stirring of molten and/or semi-molten material; more particularly to a device and method for at least partially monitoring and/or controlling the heating, cooling, and/or stirring of molten and/or semi-molten material and sensing the condition of the molten and/or semi-molten material; and still more particularly to a device and method for at least partially monitoring and/or controlling the heating, cooling, and/or stirring of molten and/or semi-molten material and sensing the condition of the molten and/or semi-molten material, and providing an arrangement to transfer the molten and/or semi-molten material to a forming device.

BACKGROUND OF THE INVENTION

Metal processing and forming is an important industrial process. It is often desirable to form or cast a metal product from a metal that is in a molten state that is not entirely liquid. At the same time, it is desirable to control selected properties of the material, such as viscosity. One known process of controlling the material properties consists of shearing a molten alloy with a stirring apparatus, while at the same time cooling the metal through the semi-solid temperature range of the alloy (i.e., a temperature ranging between the liquidus temperature and the solidus temperature) during which time the material will have a varying solids fraction (fs), but will have a consistency more solid than liquid. The liquidus temperature is the minimum temperature at which all components of a mixture (such as a metal alloy) can be in a liquid state. Below the liquidus temperature, the mixture will be partly or entirely solid. The solidus temperature is the maximum temperature at which all components of a mixture (such as a metal alloy) can be in a solid state. Above the solidus temperature, some or all of the mixture will be in a liquid state.

This type of metal processing results in initiation nucleation in the mixture when the melt temperature of the mixture has dropped below the liquidus temperature, thereby preventing the normally-occurring formation of a dendritic (i.e., needle-like, crystalline structure in the material). During this type of metal processing and when the semi-solid material is at a specific solids fraction, the multi-constituent alloy material has a structure consisting of solid, spheroidal "α-particles" (i.e., solid particles having a higher melting point primary constituent) that are surrounded by a eutectic liquid (i.e., a liquid comprising lower melting point constituents). As such, during the processing of the mixture, the semi-solid material, hereinafter referred to as "SSM," has a viscosity which enables the mixture to be handled as a semi-rigid mass. Such semi-rigid mass of the mixture can be injected into a mold under conditions of laminar flow, unlike the turbulent flow usually characterizing a conventional fully molten alloy forming and injection process.

Injecting SSM into a mold under laminar flow can eliminate many common defects associated with a conventional molten metal process for producing die castings, permanent mold castings and other casting methods. These defects include shrinkage porosity, formation of oxides, and gas porosity. Each of these defects can cause reduced mechanical properties of the formed mixture, such as lowered strength, reduced fatigue life, and/or reduced ability of the castings to satisfactorily be heat treated, which is typically employed to optimize strength and elongation of the casted product.

Another beneficial feature of a process that includes the shearing of a molten alloy is that after processing the SSM, the material can be allowed to fully solidify, and upon subsequent re-heating, the material retains the spheroidal "α-particle" SSM structure throughout its semi-solid temperature range. This latter reheating process has been a common and preferred practice due to the ability to create metal stock having the SSM structure through a high-volume bar casting operation. The bars can be readily shipped to a production facility, cut to a selected size, and then re-heated to a semi-solid condition in preparation for a forming or casting operation. However, this process is expensive due to costs associated with equipment used for reheating the SSM and casting the processed bar stock, as well as the inability to recycle processed material and scrap on-site while retaining the SSM structure.

Melting, cooling, and processing of SSM material on-site from standard raw metal stock can result in economies in both equipment and material recycling compared to the reheating process, in large part because expensive re-heating equipment is not required, and large quantities of material are not maintained in process—material that can be rendered unusable if an interruption of the heating or forming process should occur. This standard metal production process is performed with standard furnaces and molten metal transfer equipment. Scrapped metal can be readily recycled and reprocessed into an SSM condition on-site, as needed. Some cost is incurred for an on-site processing unit, but this is typically significantly less than the total cost of all the specialized equipment needed for the reheating process.

In both the reheating process and a conventional production process, the goal is to create a selected microstructure in the finished metal. A significant benefit of the SSM process and subsequent forming of the material into finished products is the ability for the viscous SSM material to flow in a laminar fashion into a mold, which minimizes the occurrence of defects.

Benefits from this process include improved mechanical properties and fatigue life, based on the minimization of oxides, gas porosity and shrinkage porosity. Safety-critical and pressure-sensitive components are prime candidates for these SSM forming processes.

Conventionally, the desired SSM condition is determined by the temperature of the molten metal charge using a thermocouple. The thermocouple is either immersed in the material, or embedded in the container holding the material. An alternate method is to retrieve a sample of material, and cut or knead the material with a spatula to get a "feel" for the viscosity. However, such alternate methods are imprecise, destructive, and involve a separate process step that is not "in line" with the essential melting and casting process. The thermocouple has limitations because it is effectively sacrificial, and can degrade, erode, or become fouled during use.

Other methods of process control are performed on a time basis, programmed via an algorithm that takes into account only the initial molten metal temperature through thermocouple sensing, and the known thermal characteristics of the metal alloy. This control method is unreliable since it does not take into account all variables, such as container temperatures and ambient temperatures. Existing methods also do not enable continuous monitoring of the condition of the SSM material throughout the charging, processing, delivery or transfer steps of the forming process.

A semi-liquid material, hereinafter referred to as "SLM," also has a temperature ranging between the liquidus temperature and the solidus temperature, but with a consistency more liquid than solid. SLM is also utilized for forming and casting operations. Existing SLM methods also suffer from limitations. Such methods do not account for irregular forming cycle times caused by downstream machine interruptions, operator interruptions, or short-term maintenance interruptions. If a standard cooling cycle is delayed or interrupted, the SLM charge must be scrapped, and another metal charge must be processed when the machine interruption has been resolved. This can result in wasted material, and with attendant increased costs. Also, existing SLM methods are unable to control the SLM process in a manner that ensures that the temperature and viscosity conditions of the SLM charge are consistently the same for each metal charge.

In view of the current state of the art, there is a need for an apparatus and method that overcomes the past deficiencies associated with processing SSM/SLM. In particular, there is a need for an apparatus and method that can be used to control the SSM/SLM process in a manner that ensures that the temperature and/or viscosity conditions of the SSM/SLM charge are consistently the same for each metal charge, and which apparatus and method allows for continuous monitoring of the condition of the SSM/SLM material throughout the charging, processing, and delivery or transfer steps of a forming process.

SUMMARY OF THE INVENTION

The present invention is directed to a semi-liquid metal (SLM) and/or semi-solid metal (SSM) processing and sensing device that overcomes the past deficiencies associated with processing SSM/SLM. As used herein, the terms SSM and SLM will be used interchangeably, and both refer to a metal or metal alloy that is at a temperature ranging between the liquidus temperature and the solidus temperature of the metal or metal alloy.

In one non-limiting embodiment of the invention, there is provided a processing and sensing device that includes a crucible or container system that is at least partially encircled by at least one induction coil. The semi-liquid condition of the metal or metal alloy in the crucible or container system can be designed to be sensed and/or be actively controlled by the induction power supply via real time or non-real time analysis of electrical feedback signals that are obtained from the at least one induction coil. In one non-limiting aspect of this embodiment, the one or more induction heating coils can be water-cooled solenoid induction coils; however, this is not required. In another and/or alternative non-limiting aspect of this embodiment, the one or more induction coils can be designed to generate a variable power and/or variable frequency magnetic field which can be modulated to control the cooling of a molten metal charge in the crucible or container system from the liquid, molten metal temperature to a selected heat content, resistivity and/or viscosity below the liquidus temperature of the material. In still another and/or alternative non-limiting aspect of this embodiment, the one or more induction coils can be designed to create a magnetic field that induces toroidal agitation of the metal charge in the crucible or container system. In yet another and/or alternative non-limiting aspect of this embodiment, the one or more induction coils can be designed to create a single zone of heating and/or stirring in the crucible or container system, or multiple induction coils can be used to create multiple zones of heating and/or stirring in the crucible or container system. Several prior art arrangements of the apparatuses and method that can be used in the present invention to process metals and metal alloys between the liquidus temperature and the solidus temperature of the metal or metal alloy are disclosed in U.S. Pat. Nos. 7,216,690; 7,169,350; 7,132,077; 6,991,970; 6,932,938; 6,796,362; 6,637,927; 6,443,216; 6,432,160; 6,402,367; 6,399,017; 5,219,018; and 4,434,837; and United States Publication No. 2007/0187060; all of which are fully incorporated herein by reference. For example, U.S. Pat. Nos. 7,169,350; 6,991,970; and 6,432,160 disclose an apparatus and method for producing an "on-demand" semi-solid material for use in a casting process. The apparatus can include various stations which have the requisite components and structural arrangements that are to be used as part of the process. The apparatus and method includes the use of electromagnetic stirring and various temperature control and cooling control techniques and an apparatus that is used to facilitate in the production of the semi-solid material within a comparatively short cycle time. The apparatus and method also includes structural arrangements and techniques that are used to discharge the semi-solid material directly into a casting machine shot sleeve. The apparatus and method disclosed in U.S. Pat. Nos. 7,169,350; 6,991,970; and 6,432,160 can be fully or partially used in the present invention. U.S. Pat. Nos. 7,132,077; 6,932,938; 6,796,362; 6,443,216; and 6,399,017 disclose a crucible or container system for holding metals and metal alloys between the liquidus temperature and the solidus temperature of the metal or metal alloy. The crucible or container system can include a mechanical or electromagnetic ejection system for discharging the processed metal or metal alloy from the crucible or container system. The crucible or container system can include a cooling arrangement and/or insulation arrangement. The crucible or container system disclosed in U.S. Pat. Nos. 7,132,077; 6,932,938; 6,796,362; 6,443,216; and 6,399,017 can be fully or partially used in the present invention. U.S. Pat. Nos. 7,169,350; 6,991,970; 6,637,927; 6,432,160; 6,402,367; 5,219,018; and 4,434,837 disclose an apparatus and method for mechanical or electromagnetic stirring of metals and metal alloys between the liquidus temperature and the solidus temperature of the metal or metal alloy that are contained in a crucible or container system. The stirring arrangements disclosed in U.S. Pat. Nos. 7,169,350; 6,991,970; 6,637,927; 6,432,160; 6,402,367; 5,219,018; and 4,434,837 can be fully or partially used in the present invention.

In another and/or alternative non-limiting embodiment of the invention, there is provided a processing and sensing device that includes the use of a crucible or container system that is at least partially encircled by at least one induction coil and which the temperature of the metal or metal alloy in the crucible can be determined via real time or non-real time analysis of electrical feedback signals that are obtained from the at least one induction coil. In such an arrangement, the use of prior art thermocouples can be eliminated. As stated above, prior art thermocouples were contact thermocouples positioned in or about a crucible or container system. Such prior art thermocouples had a tendency to erode over time, thus providing inaccurate readings that could result in improper temperatures in the crucible or container system. Additionally, the maintenance of these prior art thermocouples could be difficult, time consuming, and costly.

In another and/or alternative non-limiting embodiment of the invention, there is provided a processing and sensing device that includes the use of a crucible or container system that is at least partially encircled by at least one induction coil and which the induction coil can be designed to be sensed and be actively controlled by the induction power supply via real time or non-real time analysis of electrical feedback signals that are obtained from the at least one induction coil. As such, the prior art method of control of the process of heating, cooling and/or dispensing a metal or metal alloy from a crucible or container system based on a predetermined time basis, and/or a preprogrammed algorithm which only takes into account the initial metal or metal alloy temperature as such metal or metal alloy is initially placed in the crucible or container system is eliminated by the process of the present invention. Such prior art control process are unreliable since the prior art process does not and cannot take into account all of the variables associated with the metal or metal alloy in the crucible or container system (e.g., container temperature, ambient temperature, etc.). The control system in accordance with the present invention has the ability to constantly or periodically monitor the temperature of the metal or metal alloy in the crucible or container system and thereby provide realtime or near realtime control of the temperature of the metal or metal alloy in the crucible or container system throughout the charging, processing and delivery/transfer stages of the metal or metal alloy. Prior art control systems have no way to account for irregular forming cycle times caused by downstream machine interruptions, operator interruptions or short-term maintenance interruptions. As such, if the standard cooling cycle is delayed or interrupted, the metal or metal alloy in the crucible or container system will likely have to be scrapped and another charge processed when the machine is ready to restart casting. The control system in accordance with the present invention has the ability to monitor and maintain the temperature of the metal or metal alloy in the crucible or container system during such interruptions so that the metal or metal alloy does not have to be scrapped and that the metal or metal alloy is delivered to the cast and/or shot sleeve at the desired temperature. Prior art control systems have no satisfactory way to control the temperature of the metal or metal alloy in the crucible or container system so as to guarantee that the condition/consistency/viscosity of the metal or metal alloy dispensed from the crucible or container system has the same physical characteristics (e.g., temperature, viscosity, etc.). The control system in accordance with the present invention has the ability to monitor and maintain the physical characteristics of the metal or metal alloy each time the metal or metal alloy is dispensed from the crucible or container system. As such, the control system in accordance with the present invention overcomes many of the deficiencies of prior art control systems and to provide a control system that is more economical, repeatable and robust than it is practiced currently in the casting industry.

In one non-limiting specific arrangement of the present invention, there is provided a control system that includes a generator (i.e., processing device), which control system is designed to 1) periodically or continually sense the condition of a metal or metal alloy in the generator from the time the metal or metal alloy is introduced in the generator to the time the metal or metal alloy is poured out of or otherwise expelled from the generator to a receptacle of a forming machine (i.e., shot sleeve, sprue, funnel, etc.), 2) control of the cooling, heating and/or stirring (for thermal homogeneity) of the metal or metal alloy in the generator so as to ensure that the metal or metal alloy delivered to the forming machine is of repeatable, consistent thermal, micro-structural and viscous condition shot-to-shot, and/or 3) provide a continuous means for transfer of the material (e.g., after the molten metal or metal alloy is introduced into the generator) from the generator to the forming machine. The generator can be uncoupled to either the molten metal source and/or forming machine receptacle; however, this is not required; however, it can be appreciated that the generator is physically coupled to the molten metal source and/or the forming machine receptacle. In one non-limiting design, the generator includes a generally cylindrical chamber or crucible (e.g., graphite, ceramic/refractory, combination of metal and graphite and/or ceramic, etc.) which holds the molten metal (e.g., molten aluminum, molten aluminum alloy, etc.) that is initially poured or otherwise inserted into the generator. The generally cylindrical chamber or crucible can be at least partially surrounded on the outside within about 0.01-1 inch of the outer surface of the generally cylindrical chamber or crucible by a solenoid induction coil. This coil is generally fixed at a generally uniform distance from the outer surface of the generally cylindrical chamber or crucible with refractory spacers so as to insure a centering of the generally cylindrical chamber or crucible within the induction coil; however, this is not required. The wound coil height is generally sufficient to enclose the entire generally cylindrical chamber or crucible, and can include an extension beyond the length of the crucible at the top and/or bottom of the generally cylindrical chamber or crucible a distance of up to one third of the generally cylindrical chamber or crucible height (e.g., for a 6 inch high crucible, the total length of the induction coil could be up to about 10 inches long). This over extension of the induction coil, when used, facilitates in 1) the even heating of the generally cylindrical chamber or crucible at the top and bottom of the generally cylindrical chamber or crucible, and/or 2) the proper stirring of the metal or metal inside the generally cylindrical chamber or crucible by the electromagnetic force of the induction field generated by the induction coil. The annular space between the induction coil and the generally cylindrical chamber or crucible can be at least partially filled either with rammed/compacted dry refractory material, mica paper, or cast into place within the induction coil using a refractory type cement; however, this is not required. The purpose of the rammed/compacted dry refractory material, mica paper, or cast refractory type cement, when used, is to provide intimate contact between the induction coil and the generally cylindrical chamber or crucible. This intimate contact, when created, enables heat extraction from the generally cylindrical chamber or crucible to the water-cooled induction coil, while at the same time heating of the metal or metal alloy in the generally cylindrical chamber or crucible can be provided by the induction coil. The total effect of the cooling capacity of the induction coil and the heating capacity of the induction coil is to provide a fast response method to control the temperature, viscosity and/or fraction solid ($f_s$) content of the metal or metal alloy in the generally cylindrical chamber or crucible. The ability to control the cooling rate and the temperature of the metal or metal alloy in the generally cylindrical chamber or crucible enables the delivery of a metal or metal alloy charge in a repeatable fashion to a forming device, even in the event of a cycle delay or production interruption. The entire crucible and coil assembly can be contained inside a protective, electrically non-conductive housing for safety and protection of the equipment; however, this is not required. The induction coil is generally powered by a variable frequency power supply (e.g., 10-10000 Hz, etc.). This power supply can be designed to operate in a single frequency range or a simultaneous, multiple frequency mode to enhance toroidal stirring for homogeneity and/or to better control the heating/cooling process. The control system for the generator can be designed to 1) sense the condition of the molten/semi-solid/liquid metal or metal alloy charge in the generator, and/or 2) control the heating and/or cooling rates of the metal or metal alloy charge in the generator based on control signal from the induction coil. In one non-limiting arrangement, a feedback or control signal is obtained from the induction coil that is doing the heating and cooling. This signal can be also or alternatively be obtained from a second, unpowered solenoid coil in close proximity to the metal or metal alloy charge in the generator. As such, the feedback or control signal can be obtained from direct contact with the induction coil or indirectly (i.e., a non-contact source) from the induction coil. For instance, the control board of the induction power unit can be equipped with signal conditioning that monitors (e.g., continuously, periodically) the load on the induction coil. This load is the induction coil and the conductive material inside the induction coil. The conductive material can be considered the metal or metal alloy charge in the generator and the generator itself if the generator material is conductive (e.g., graphite, metal, etc.). Electrically sensed changes in the load are due to thermal changes and metallurgical changes in the metal or metal alloy charge in the generator as the metal or metal alloy cools down and heats up. One of the changes of electrical parameters that can be sensed is a resistivity change in the metal or metal alloy charge in the generator which produces a change in the induction coil voltage. As can be appreciated, other or additional electrical parameters can be sensed for purposes of monitoring and/or controlling the operation of the generator. These one or more sensed electrical parameters can be used to at least partially determine, monitor and/or control a property of the metal charge includes, but is not limited to, a load resistance inside a region that is at least partially encircled by the induction coil, a resistivity of the metal charge, a temperature of the metal charge, a solid fraction of the metal charge, and/or a liquid fraction of the metal charge. As can be appreciated, other properties of the metal charge can be monitored, determined and/or controlled by the sensing of one or more electrical parameters. This voltage change can be used as a feedback signal to control the heating and cooling process for the metal or metal alloy charge in the generator. Using various signal conditioning features in the induction control system, this voltage signal and/or other available signals reflecting the condition of the metal or metal alloy charge in the generator can be used to modulate and control the physical process of cooling, heating and/or holding the temperature metal or metal alloy charge in the generator. The induction control system can be designed to provide the signal and track the signal even when modulating the power output. Therefore the control of the heating and cooling process of the metal or metal alloy charge in the generator can be 1) continuous, 2) non-contact (i.e., no thermocouple required in the molten metal or metal alloy or crucible wall), 3) able to be adjusted to a desired operating point, and/or 4) able to deliver the metal or metal alloy charge in the generator to the forming station. The heating and cooling control system for the metal or metal alloy charge in the generator can be used in conjunction with one of the other SSM/SLM production methods. For example, some other control system can be used to initiate the nucleation process of the metal or metal alloy and then the process control can be used to control the heating and cooling of the metal or metal alloy in the generator to insure a homogeneous temperature for the metal or metal alloy. The control system can also be used to obtain and then maintain, if necessary, a desired temperature of the metal or metal alloy in the generator to the point that the metal or metal alloy is delivered to the forming station. Depending on the design of the forming machine and its charge receptacle, the generator can be designed to be tilted so as to pour a charge into a vertically or horizontally oriented shot sleeve. The generator and the connecting induction power leads can be affixed to a multi-axis (e.g., typically 3 or more axes) robot/mechanical arm; however, this is not required. This robot arm, when used, can have sufficient motion to move the generator to a position to accept a molten metal charge (e.g., from a ladle, metal pump, dosing furnace, etc.). The robot arm can be designed to move the generator and the connecting induction power leads to an intermediate position to create the SLM structure at a separate nucleation device or to create the SLM structure by the generator internally in transit to the delivery point at the forming station. The robot arm can then be designed to move the generator and the connecting induction power leads to a forming station wherein the generator is tilted to pour or slide out of the metal or metal alloy charge or actively is engaged via a plunger/piston to inject the metal or metal alloy charge into the forming or injection chamber of the forming machine. The induction power supply can either be an integral part of the delivery unit or placed separately, remote from the robot arm and process area. As can be appreciated, the generator can be part of a fully coupled unit. In such an arrangement, the generator accepts a metered charge though a heated transfer tube directly from a dosing furnace or molten metal pump. The molten metal passes through the generator wherein the charge is cooled and stirred. The induction coil can be a single solenoid powered by a single frequency generator or triple-wound independent coil supplied by a three phase frequency induction generator to enhance metal movement through the generator. The charge would be held in the generator section at a controlled condition. When the cycle calls for metal for injection, the metal supply device (pump or dosing unit) is actuated and the generator proceeds to move the charge along the heated conduit into the forming/injection chamber as a new volume of molten metal is introduced into the generator.

Some of the non-limiting features of the control system are:

- The process equipment and method can be designed to continuously or intermediately sense the degree of semi-solid/liquid material that is present in a volume of material in-process without physical contact with the metal charge.
- The containment device or crucible can be made from graphite.
- The containment device or crucible can be made from stainless steel alloys and lined with graphite, silicon nitride, and/or other refractory ceramic materials.
- The containment device or crucible can be a ceramic refractory.
- The containment device or crucible can be affixed within the solenoid heating/cooling coil rammed with dry refractory material.
- The containment device or crucible can be affixed within the solenoid heating/cooling coil by means of a cast-in refractory cement.
- The solenoid induction coil surrounding the crucible can serve as a cooling device.
- The solenoid induction coil surrounding the crucible can serve as a heating device.
- The solenoid induction coil surrounding the crucible can serve as a sensing device.
- The invention can be used to process non-ferrous alloys.
- Aluminum alloys are the preferred charge material for the generator.
- The invention can be utilized to process ferrous alloys.
- Sensing of a process control signal can be accomplished via the induction heating/cooling coil feedback to the induction power supply.

Sensing of a process control signal can be done via a separate solenoid coil in proximity to the charge.

The equipment and method can control the process used to produce and hold the material in a manner that a semi-solid charge of the material can be delivered to a forming device at the desired fraction solid repeatedly, cycle-to-cycle.

The generator can be attached to a multi-axis robot arm to avoid any in-process material transfers that can introduce contamination to the charge.

The equipment can be directly coupled to a molten metal supply and/or a metal forming device.

The equipment can be utilized in an uncoupled mode to a metal source and forming device.

The metal or metal alloy in the generator can be used to continuously monitor the solid fraction and/or liquid fraction of the metal charge.

The control system for the generator can be designed to continuously control the metallurgical condition of the metal charge to a selected condition in a repeatable fashion.

The mixing of the metal charge in the generator can be toroidal mixing.

The uncoupled generator can be enclosed on the top opening so that an inert gas can be introduced over the metal charge to limit or prevent oxide generation.

It is one non-limiting object of the present invention to provide an apparatus and method that can determine, monitor and/or control one or more physical properties of a metal or metal alloy in a crucible or container system via analysis of one or more sensed electrical parameters (e.g., electrical feedback signals obtained from the at least one induction coil that is positioned at least partially about the crucible or container system, etc.).

It is another and/or alternative non-limiting object of the present invention to provide an apparatus and method that can determine the temperature, solids fraction, and/or liquid fraction of a metal or metal alloy in a crucible or container system via analysis of electrical feedback signals obtained from the at least one induction coil that is positioned at least partially about the crucible or container system.

It is still another and/or alternative non-limiting object of the present invention to provide an apparatus and method that can determine and/or control of the temperature of a metal or metal alloy in a crucible or container system via analysis of electrical feedback signals obtained from at least one induction coil that is positioned at least partially about the crucible or container system.

It is yet another and/or alternative non-limiting object of the present invention to provide an apparatus and method that can control the processing of a metal or metal alloy from the time the metal or metal alloy is deposited in a crucible or container system to the time the metal or metal alloy is poured out of or ejected from the crucible or container system, and wherein at least a portion of the information for such processing control is obtained from the analysis of electrical feedback signals obtained from the at least one induction coil that is positioned at least partially about the crucible or container system.

It is still yet another and/or alternative non-limiting object of the present invention to provide an apparatus and method that can determine the temperature of a metal or metal alloy in a crucible or container system without the use of a thermocouple.

It is another and/or alternative non-limiting object of the present invention to provide an apparatus and method that can determine and control the temperature of a metal or metal alloy in a crucible or container system without the use of a thermocouple.

It is still another and/or alternative non-limiting object of the present invention to provide an apparatus and method that can determine, monitor, and/or control at least one property of a metal charge in a generator is subjected to a magnetic field formed by at least one induction coil by using a sensing arrangement to directly sense and/or indirectly sense at least one electrical parameter, which at least one electrical parameter can be used to at least partially determine a load resistance inside a region that is at least partially encircled by the at least one induction coil, a resistivity of the metal charge, a temperature of the metal charge, a solid fraction of the metal charge, and/or a liquid fraction of the metal charge.

It is still another and/or alternative non-limiting object of the present invention to provide an apparatus and method that includes the use of a controller to at least partially control a power level to an at least one induction coil based on at least one sensed electrical parameter.

It is yet another and/or alternative non-limiting object of the present invention to provide an apparatus and method that includes the use of a controller to at least partially controls a reduction of temperature of a metal charge from a liquidus temperature of the metal charge to a temperature greater than a solidus temperature of the metal charge so that the metal charge has a certain solid fraction and liquid fraction just prior to a time the metal charge is poured from or otherwise ejected from a generator.

It is still yet another and/or alternative non-limiting object of the present invention to provide an apparatus and method that senses at least one electrical parameter from feedback from at least one induction coil.

It is another and/or alternative non-limiting object of the present invention to provide an apparatus and method that senses at least one electrical parameter from a solenoid coil in proximity to at least one induction coil.

It is still another and/or alternative non-limiting object of the present invention to provide an apparatus and method that mathematically manipulates (e.g., taking derivatives of parameters, correlating data, curve fitting, etc.) at least one sensed electrical parameter to at least partially used to determine one or more tends in physical properties (e.g., temperature of metal charge over time, resistivity of metal charge over time, load resistance encountered by induction coil over time, resistivity of metal charge to power to induction coil, resistivity of metal charge to temperature of metal charge, etc.) of the metal charge.

These and other objects and advantages will become apparent to those skilled in the art upon the reading and following of this description taken together with the accompanying drawings.

BRIEF DESCRIPTION OF THE DRAWINGS

Reference may now be made to the drawings, which illustrate various embodiments that the invention may take in physical form and in certain parts and arrangements of parts wherein.

DESCRIPTION OF NON-LIMITING EMBODIMENTS OF THE INVENTION

Referring now in greater detail to the drawings, wherein the showings are for the purpose of illustrating various embodiments of the invention only, and not for the purpose of limiting the invention, the present invention is directed to a SML/SSM processing and sensing device, hereinafter also referred to as a "generator," for preparing SML/SSM for use in metal forming or casting operations. In general, the process includes cooling the metal charge to the liquid, molten metal temperature of the metal charge after the metal charge has been inserted into the generator, then further cooling the metal charge in a controlled manner with electromagnetic stirring and/or other types of stirring in order to minimize the formation of a dendritic crystalline structure, and/or to facilitate the formation or nucleation of a spheroid α-particle structure in the metal charge. The rate of cooling, and the condition of the molten metal charge below the liquidus temperature can be at least partially determined by measuring the heat content of the molten metal charge. In accordance with one non-limiting aspect of the present invention, the heat content of the molten metal and/or SML/SSM in the generator can be at least partially determined indirectly by determining the electrical resistivity of the molten metal charge and/or SML/SSM in the generator by measuring the changing voltage, current, resistance, and/or power that is reflected in the feedback of the heating/cooling coil as the condition and temperature of the molten metal charge and/or SML/SSM changes in the generator. In accordance with another non-limiting aspect of the present invention, the molten metal charge and/or SML/SSM in the generator can be agitated by exposing the molten metal charge and/or SML/SSM to an alternating magnetic field. In accordance with still another non-limiting aspect of the present invention, the SML/SSM in the generator can be maintained within a desired temperature range and/or maintained to have desired physical properties up to the point of delivery of the SML/SSM to a forming or casting apparatus.

Figure 1:
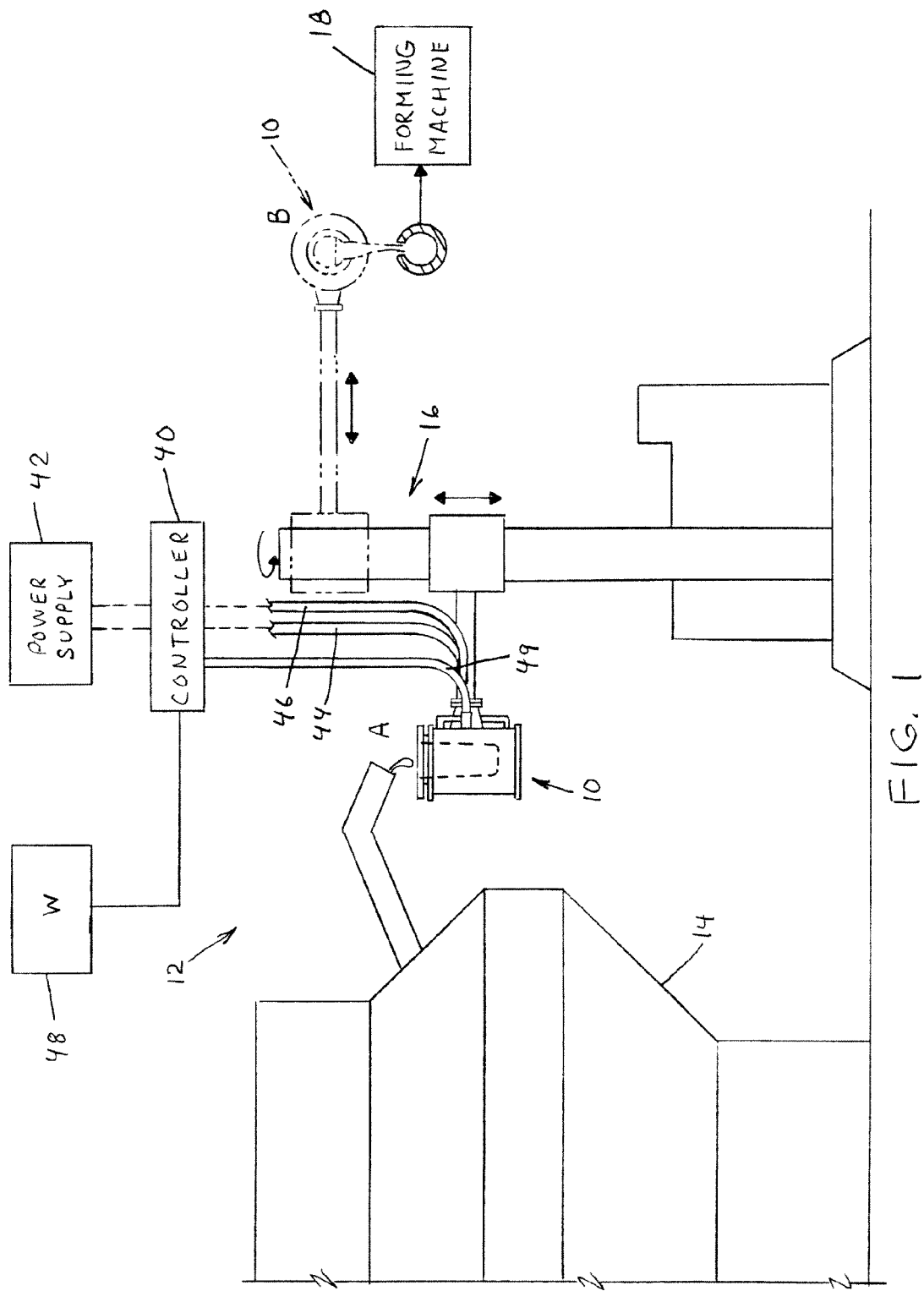
FIG. 1 is a schematic representation of a non-limiting metal casting assembly comprising a semi-liquid metal processing and sensing device according to the present invention.

Referring to FIG. 1, a generator 10 according to the present invention is illustrated. Generator 10 comprises part of a metal casting assembly 12 comprising a known furnace 14 (e.g., dosing furnace, etc.) to supply molten metal. As illustrated in FIG. 1, the motel metal is supplied to generator 10 by use of a robotic arm assembly 16. As can be appreciated, the molten metal can be supplied to the generator by other or alternative means such as, but not limited to, an automatic ladling transfer device, a device to tilt generator 10 to pour out the SLM/SSM charge, and/or a known forming or casting apparatus to accept the SLM/SSM charge. The use and type of a furnace to melt a metal charge is well known in the art, thus will not be described in detail herein. Likewise, the formation of a metal charge in a forming or casting apparatus is well known in the art, thus will also not be described in detail herein. Non-limiting types of processing devices that include the use of a furnace and forming or casting apparatus that can be used in the present invention are disclosed in U.S. Pat. Nos. 7,169,350; 6,991,970; and 6,432,160, all of which are incorporated herein by reference.

Figure 2:
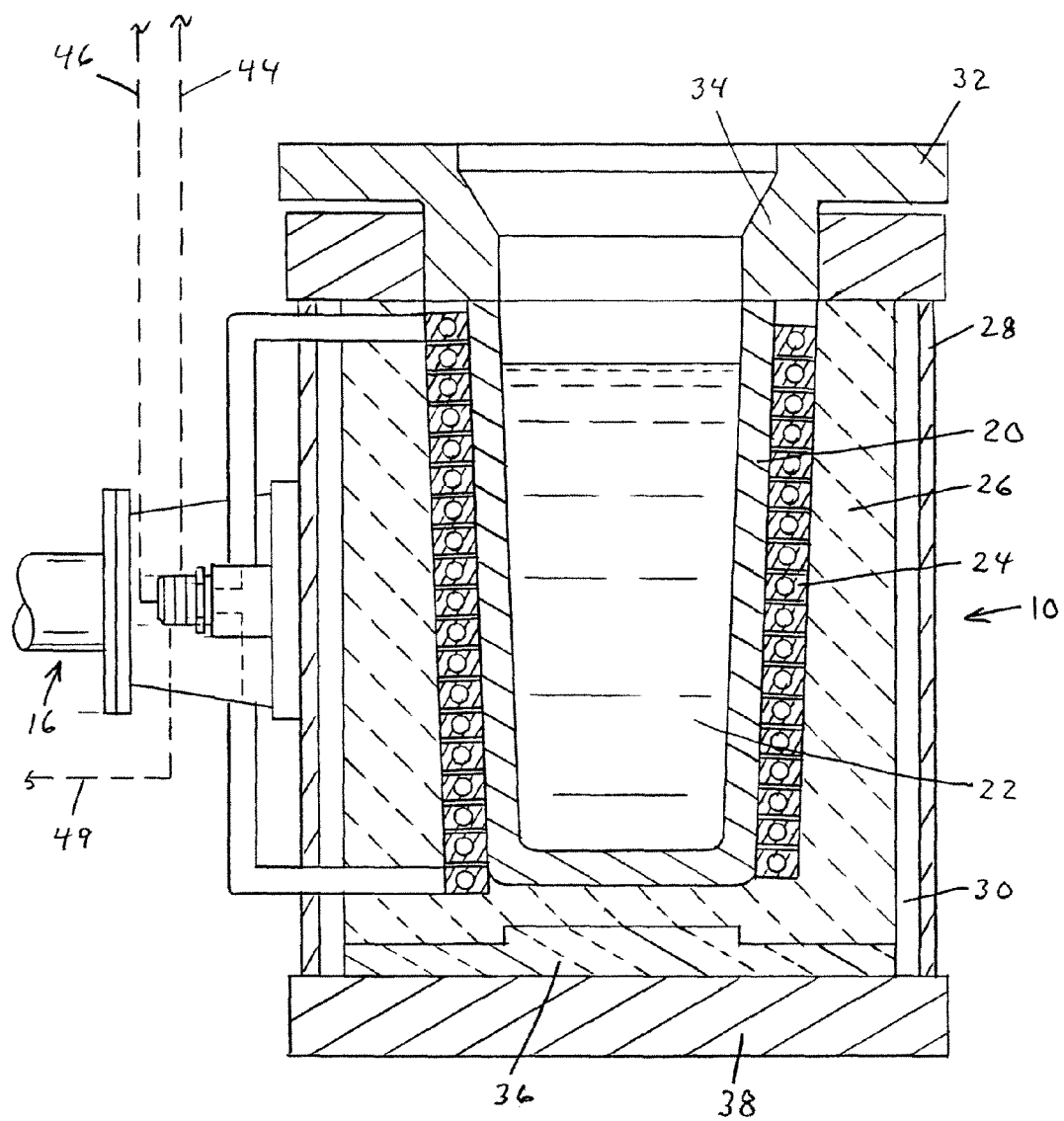
FIG. 2 is a schematic representation of the non-limiting semi-liquid metal processing and sensing device illustrated in FIG. 1, illustrated as a sectional view.

Referring to FIG. 2, generator 10 is illustrated as comprising an open-topped crucible 20 adapted to hold a metal charge 22 of molten metal and/or SML/SSM such as, but not limited to, aluminum or an aluminum alloy. The crucible has a cavity having a generally circular cross-sectional shape; however, it can be appreciated that other cross-section shapes can be used. The outer shape of the crucible also has a generally circular cross-sectional shape; however, it can be appreciated that other cross-section shapes can be used. The cross-sectional area of the crucible cavity and/or outer shape can be constant or variable. As illustrated in FIG. 2, the cross-sectional area of the crucible cavity and the outer shape is tapered, thus varies over the length of the crucible. The tapered cavity of the crucible has the advantages of enabling easier cleaning of the cavity and easier removal of the metal charge in the cavity. The tapered outer shape of the crucible has the advantage of making the crucible easier to replace in the generator. As can be appreciated, the crucible can have other shapes. The present invention will be described herein with respect to an exemplary aluminum alloy charge, although the invention is also suitable for processing other molten materials such as, but not limited to, ferrous and non-ferrous alloys, precious metals, and the like.

Crucible 20 is generally fabricated of a material having suitable strength, durability, and thermal properties for the temperatures and metal charge mass to which the crucible 20 will be exposed. Suitable materials can include, but are not limited to, graphite, known ceramic or refractory materials, or a combination of metal and graphite or ceramic materials. The open end of the crucible 20 can be circumscribed by an annular top flange 32 transitioning to the crucible 20 through an annular refractory cap 34; however, this is not required. The annular top flange can be provided with a means to close the crucible opening for the purpose of introducing an inert gas (i.e., nitrogen and/or argon, etc.) so as to inhibit or reduce the formation of oxides in the SLM/SSM material; however, this is not required.

Extending circumferentially around the crucible 20 is a generally well-known solenoid induction coil 24. As can be appreciated, more than one coil can extend at least partially around the crucible. In one non-limiting embodiment, induction coil 24 is cooled internally with a coolant such as, but not limited to, water. As can be appreciated, induction coil 24 can be designed to not be cooled by an internally flowing coolant. As can also be appreciated, one or more cooling coils can be positioned about the crucible so as to cool the crucible in one or more zones and/or one or more heating coils can be positioned about the crucible to heat the crucible in one or more zones; however, this is not required. Induction coil 24 can include a pair of cooling fluid leads 44, 46. In one non-limiting embodiment, cooling fluid leads 44, 46 can include a heavy-duty hose or tubing encasing a copper cable such as used in welding equipment; however, it can be appreciated that cooling fluid leads 44, 46 can be formed in other ways. The tubing, when used for cooling fluid leads 44, 46, can comprise copper tubing; however, this is not required. A the cooling fluid can be water W or some other type of cooling fluid. As illustrated in FIG. 1, a cooling fluid reservoir 48 can be used to maintain the desired amount a cooling fluid flowing through cooling fluid leads 44, 46. A tube 49 can be used to supply cooling fluid from cooling fluid reservoir 48 to the cooling fluid leads 44, 46 or induction coil about the crucible so as to maintain a desired amount of cooling fluid circulation through the induction coil and the cooling fluid leads 44, 46. The cooling fluid leads 44, 46, when used, can be couple or connected to a power supply 42 to enable current to be supplied to coil 24; however, this is not required. The power supply current through the leads 44, 46 and the induction coil 24 is alternated at one or more desired frequencies to produce a magnetic field. Typically, the desired frequencies of the alternating current is a high frequency (e.g., at least about 10 Hz); however, this is not required. The magnetic field created by the alternating current has an effect of heating the metal charge 22 in the crucible 20. Coolant can be used to circulate through induction coil 24 to maintain coil 24 at a selected temperature while the alternating magnetic field heats the metal charge 22; however, this is not required.

In another non-limiting embodiment, induction coil 24 is spaced from crucible 20. When induction heating coil is spaced from crucible 20, the spacing is generally uniform; however, this is not required. Furthermore, when induction heating coil is spaced from crucible 20, the spacing is generally at least about 0.01 inch, typically at least about 0.02 include, more typically less than about 10 inches, still more typically about 0.05-5 inches, and yet more typically about 0.1-1 inch. Induction coil 24 can be spaced at a uniform distance from the crucible perimeter with refractory spacers, which facilitate centering of the crucible 20 within the coil 24; however, this is not required.

In another non-limiting embodiment, the height of induction coil 24 can be selected to encircle the entire crucible 20, at least partially encircle the crucible, and/or extend beyond the top and/or bottom of crucible 20. Typically, the height of induction coil 24 is selected to encircle the entire crucible 20 so that uniform heating of the metal charge in the crucible can be achieved. The height of induction coil 24 can be selected to not only encircle the entire crucible 20, but to also extend above the top and/or below the bottom of the crucible; however, this is not required. When the height of induction coil 24 extends above the top and/or below the bottom of the crucible, the top and bottom extensions can either or both be up to one third the crucible height above the top and/or bottom of the crucible. For example, for a six inch crucible height, induction coil 24 can extend up to two inches above the top of the crucible and/or up to two inches below the bottom of the crucible; however, it can be appreciated that the induction coil 24 can be more than a third of the crucible height above and/or below the crucible. The extension of the induction coil above the top and/or below the bottom of the crucible facilitates in achieving even heating and/or agitation of metal charge 22 at both the bottom and top of crucible 20.

Induction coil 24 can be at least partially encased within a coupling material 26, which material 26 contacts the circumferential perimeter of crucible 20. As illustrated in FIG. 2, coupling material 26 can also contact the bottom of crucible 20; however, this is not required. The coupling material, when used, can comprise a rammed or compacted dry refractory material, mica paper, a cast-in-place refractory-type cement, or some other refractory-type material suitable for providing thermal coupling of induction coil 24 with the crucible 20. As can be appreciated, other or additional materials can be used for coupling material 26. The thermal coupling created by coupling material 26 enables concurrent heat flow from crucible 20 to the water-cooled induction coil 24 and/or another coiling coil when used, and to the heating of the crucible 20 and the molten metal charge 22 by the induction field generated by induction coil 24. As such, coolant flowing through the induction coil 24 and/or other cooling coils can be used to provide cooling of crucible 20 and metal charge 22 through the thermal coupling of coil 24 and/or other cooling coils, coupling material 26, and crucible 20. In one arrangement, the solenoid induction coil 24 can be used for both cooling and heating, thus can be used to provide a means of quickly controlling the temperature, viscosity, and solids fraction (fs) of metal charge 22 in crucible 20.

The crucible 20 and induction coil 24 can be at least partially enclosed within a housing comprising a protective, electrically non-conductive outer shell 28. The housing, when used, can include an intermediate assembly 30 of phenolic spacers and structure boards; however, this is not required. Along the closed end or bottom of crucible 20, a coupling material 26 can be provided with an insulating layer 36, and an end cap 38 can be configured to extend over the closed end in contact with outer shell 28; however, this is not required.

Referring again to FIGS. 1 and 2, induction coil 24 is electrically coupled or connected to a variable-frequency power supply 42 such as, but not limited to, a 150 kilowatt, a 480 volt, 3-phase AC input power supply. In one non-limiting embodiment, a range of output frequencies of the AC input power supply that can be utilized is 10-10,000 Hz. The power supply can be adapted to operate at a selected frequency, or in a simultaneous, multiple-frequency mode, to enhance agitation and/or stirring for homogeneity and/or to better control of the heating and cooling process. For example, a particular frequency can be selected where the cooling rate of the material is the primary parameter, with a secondary parameter being the agitation of the material to achieve a selected homogeneity. As can be appreciated, other or additional parameters can be used to select the one or more frequencies generated by the AC input power supply.

The alternating current in induction coil 24 sets up an electromagnetic field that creates a circulating current in metal charge 22. The alternating current flow in the coil generates or induces an opposite current flow in the conducting metal charge, and depending on the resistivity of the metal charge, causes the metal charge to heat at a faster or slower heating rate. As an example, for a metal charge comprising 20 pounds of aluminum, approximately 25 kW of power will be sufficient to maintain the aluminum in a molten state. In one non-limiting arrangement, the 3-phase AC input power can be converted to a DC voltage, and then inverted to a single phase AC power at a selected frequency; however, this is not required. The choice of a variable-frequency induction power supply enables the frequency to be tailored to facilitate in matching the load. Lower frequencies exert a higher electromotive repulsive force on the metal charge in the crucible.

The induction power supply 42 can be controlled by a controller 40 comprising a known closed-loop feedback system based upon voltage, power phase, and/or current feedback; however, this is not required. The closed-loop feedback system, when used, can be utilized to maintain the metal charge 22 at a predetermined heat content, fs, and/or viscosity, or a predetermined cooling rate during processing. In one non-limiting embodiment, the control of the system can be based on changes in the phase angle of the voltage and current from the induction coil. Since the phase angle is independent of the magnitude of the current and the voltage, it can provide a reliable signal even when the power is being modulated up or down in order to meet a heating and/or cooling profile or ramp.

The induction coil 24 can be instrumented with one or more sensors (not shown). These one or more sensors are typically not connected to the induction power supply. The one or more sensors can be designed to monitor one or more electrical parameters such as, but not limited to, current, voltage, power consumption, and/or frequency. From the output of the one or more sensors, particularly voltage, current, the true power load resistance on the induction coil, and/or the resistivity of the metal charge can be determined through mathematical relationships. These calculations can be performed by formulas programmed into a PLC or other type of device, which in turn is used to control the overall heating and cooling process. The ability to sense the condition of the molten charge from the feedback sensed from the induction coil eliminates the need for the typical, sacrificial thermocouples that are used to control most prior art metal working and casting processes.

The following Table 1 sets forth the grades and associated constituents for selected commercially-available alloys of aluminum. As Table 1 indicates, the constituent proportions can vary between grades and within a selected grade, including the proportions of aluminum. These variations will affect the properties of the SLM/SSM, including the liquidus temperature, the solidus temperature, the viscosity at selected temperatures, the electrical resistivity at selected temperatures, the solids fraction at selected temperatures, and the heat content at selected temperatures.

Generator 10 can be designed to control the cooling of metal charge 22 that has been heated to at least the liquidus temperature until the molten metal charge reaches a selected SLM/SSM state, and can then be delivered to a forming apparatus for fabrication of a selected product. The cooling of the metal charge can be at least partially controlled by monitoring the resistivity behavior of the metal charge. This type of control is based on the principles that a) resistivity of the metal charge varies with the heat content and/or temperature of the metal charge, b) the heat content and/or temperature of the metal charge controls the solids fraction of the metal charge, and c) the solids fraction of the metal charge correlates to the viscosity of the metal charge. Ultimately, it is desired to prepare a SLM/SSM charge having a selected viscosity for a selected forming operation. The selected viscosity can be identified by the resistivity behavior of the metal charge as a consequence of the interrelationship of resistivity, heat content, solids fraction, and/or viscosity for a selected metal charge.

Figure 3:
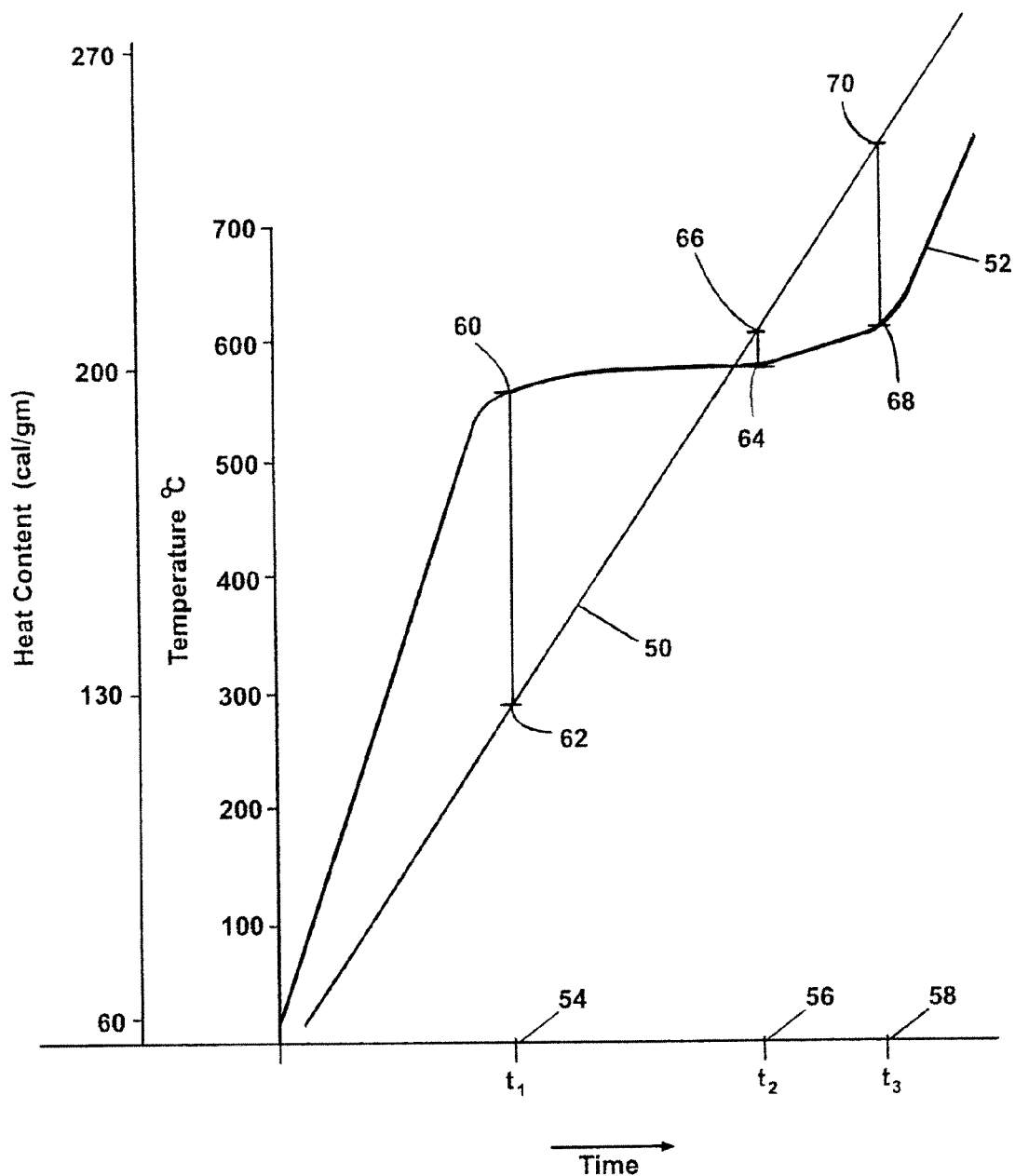
FIG. 3 is a representation of a non-limiting exemplary heat content vs. time curve and an exemplary temperature vs. time curve for a metal or metal alloy processed in the non-limiting semi-liquid metal processing and sensing device of FIG. 1.

FIG. 3 illustrates an exemplary heat content vs. time curve 50 and an associated exemplary temperature vs. time curve 52 for a metal charge heated at a constant input power and frequency. The temperature curve 52 is generally steeply linear up to a first temperature value 60, the solidus of the charge, characterized by a plateau portion between the first temperature value 60 and a second temperature value 64, the eutectic temperature of the charge, characterized by a moderate increase to a third temperature value 68, the liquidus temperature of the charge, and thereafter generally steeply linear, which represents the alloy in molten form. Time periods $t_1$, $t_2$, and $t_3$ as represented by reference numbers 54, 56, 58 respectively as associated with a time period that the metal or metal alloy reaches the solidus temperature, the eutectic temperature, and the liquidus temperature, respectively when the metal or metal alloy is exposed to a certain amount of energy. The plateau portion of the curve generally represents the metal charge in a SLM/SSM state. For instance, A356 grade aluminum alloy having about 7% silicon has a liquidus temperature of about 612° C. and heat content of about 260 cal/gm (i.e., temperature value 68 and heat content 70 at time

TABLE 1

Composition of Selected Aluminum Alloy Grades

| | \multicolumn{8}{c|}{Grade} |
|---|---|---|---|---|---|---|---|---|
| | 332.0 | A413.0 | 319.0 | A356.0 | A357.2 | A360.1 | 384.0 | 7050 |

Detailed Composition

| | 332.0 | A413.0 | 319.0 | A356.0 | A357.2 | A360.1 | 384.0 | 7050 |
|---|---|---|---|---|---|---|---|---|
| Silicon, % | 8.5-10.5 | 11-13 | 5.5-6.5 | 6.5-7.5 | 6.5-7.5 | 9-10 | 10.5-12 | 0.12 |
| Iron, % | 1.2 | 1.2 | 1 | 0.2 | 0.12 | 1.3 | 1 | 0.15 |
| Copper, % | 2-4 | 0.6 | 3-4 | 0.1 | 0.1 | 0.6 | 3-4.5 | 2-2.6 |
| Manganese, % | 0.5 | 0.35 | 0.5 | 0.1 | 0.05 | 0.35 | 0.5 | 0.1 |
| Magnesium, % | 0.5-1.5 | 0.1 | 0.1 | 0.2-0.45- | 0.45-0.7 | 0.45-0.6 | 0.1 | 1.9-2.6 |
| Nickel, % | 0.5 | 2-3 | — | — | — | 0.5 | 0.5 | 1.9-2.6 |
| Zinc, % | 1 | 0.5 | 1 | 0.1 | 0.05 | 0.4 | 3 | 0.08-0.15 |
| Tin, % | — | — | — | — | — | 0.15 | 0.35 | — |
| Titanium, % | 0.25 | 0.25 | 0.25 | 0.25 | 0.04-0.2 | — | — | 0.06 |
| Other Constituents, % | 0.5 | — | 0.5 | 0.15 | 0.1 | 0.25 | 0.5 | 0.15 |
| Aluminum, % | bal. | bal. | bal. | bal. | bal. | bal. | bal. | bal. |

$t_3$) and a solidus temperature of about 557° C. and heat content of about 130 cal/gm (temperature value 60 and heat content 62 at $t_1$) and a eutectic temperature of about 572° C. and heat content of about 225 cal/gm (temperature value 64 and heat content 66 at time $t_2$). The heat content and temperature can be correlated for a selected metal charge mass of a selected material in generator 10 having a selected configuration.

Figure 4:
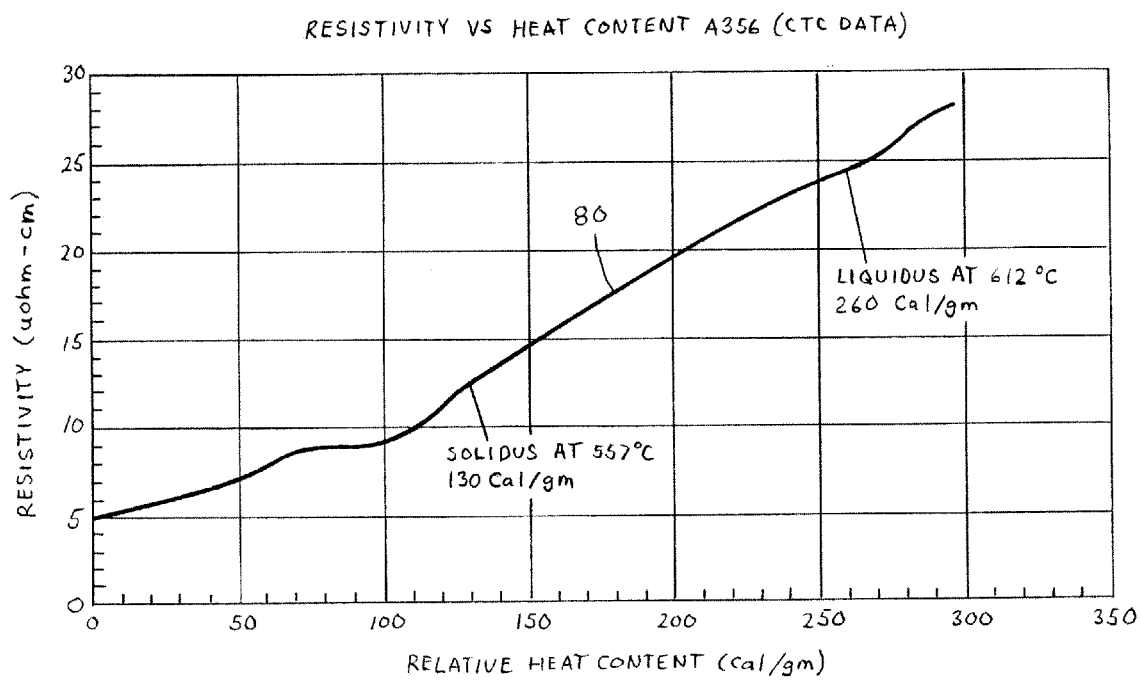
FIG. 4 is a prior art representation of a exemplary resistivity vs. heat content curve for a metal or metal alloy processed in the semi-liquid metal processing and sensing device of FIG. 1.

FIG. 4 illustrates an exemplary resistivity vs. heat content curve 80 for a selected metal charge mass of a selected material in generator 10 having a selected configuration.

Figure 6:
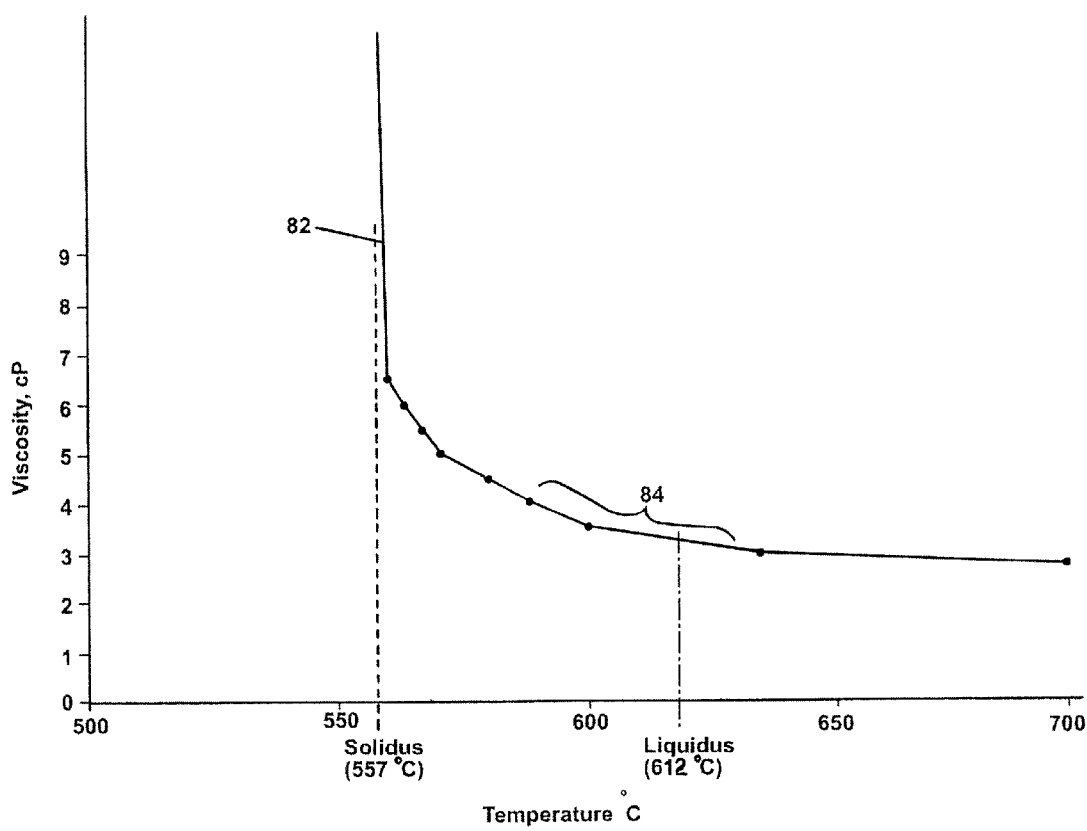
FIG. 6 is a prior art representation of a exemplary viscosity vs. temperature curve for a metal alloy charge comprising an A356 grade aluminum alloy having about 7% silicon.

FIG. 6 illustrates an exemplary viscosity vs. temperature curve 82 for a metal charge comprising an A356 grade aluminum alloy having about 7% silicon. An exemplary viscosity range 84 for SLM/SSM processing according to the present invention corresponds to an initial temperature (~630° C.) above the liquidus temperature of 612° C., ending at a SLM/SSM temperature of about 590° C. This corresponds to a final viscosity of about 4 centipoises.

Figure 7:
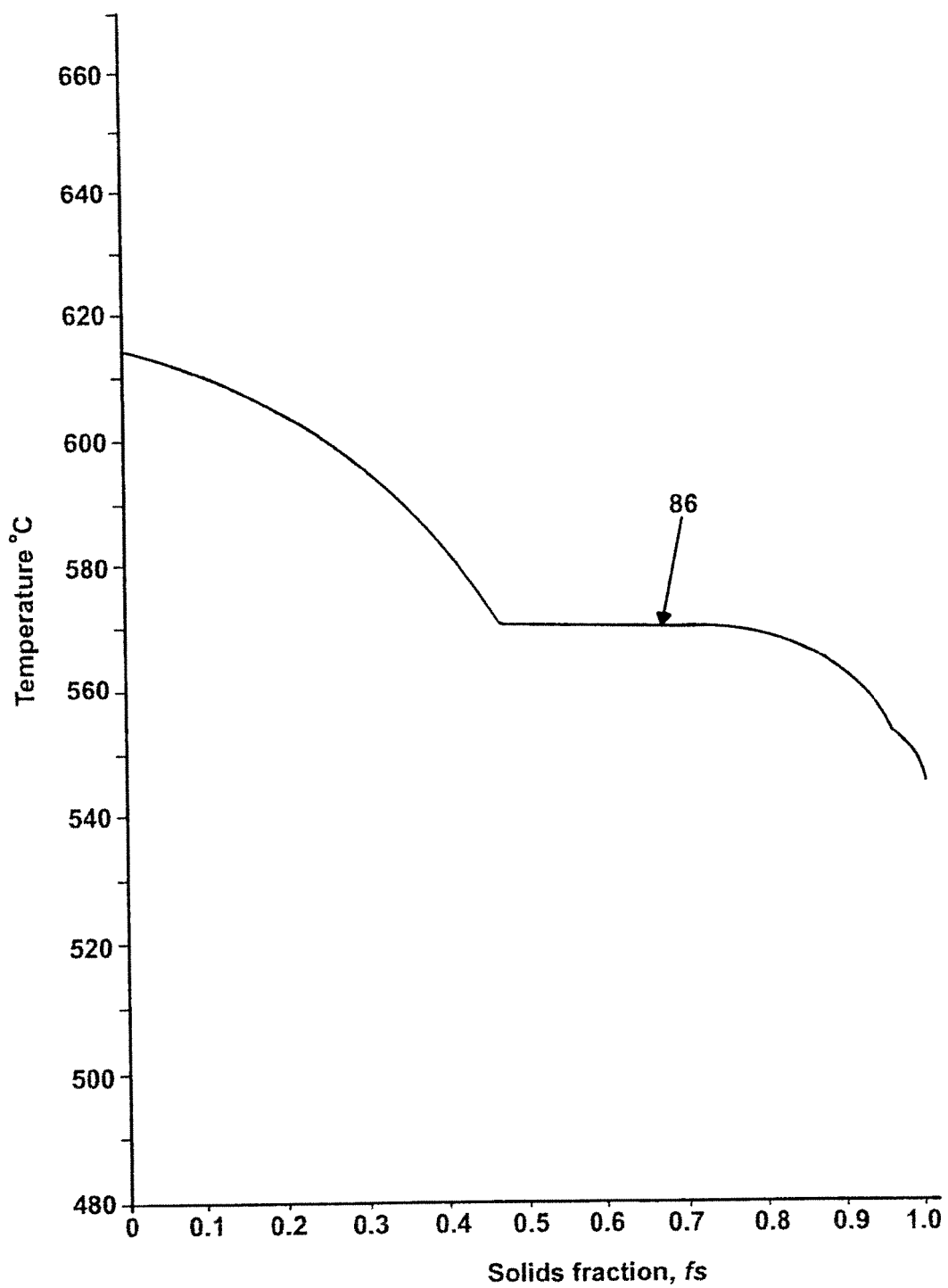
FIG. 7 is a prior art representation of a exemplary temperature vs. solids fraction curve for a metal alloy charge comprising an A356 grade aluminum alloy.

FIG. 7 illustrates an exemplary temperature vs. solids fraction curve 86 for a charge comprising a A356 grade aluminum alloy.

Figure 8:
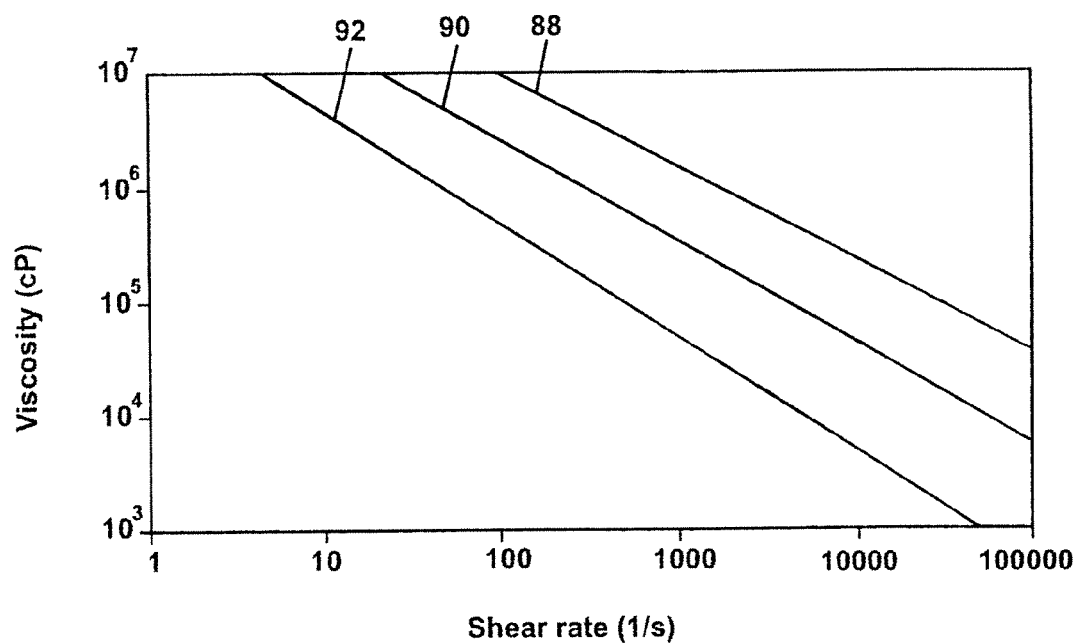
FIG. 8 is a prior art representation of a exemplary family of viscosity vs. shear rate curves for an A356 grade aluminum alloy having differing solids fractions.

FIG. 8 illustrates a family of viscosity vs. shear rate curves for a A356 grade aluminum alloy having about 70% solids fraction (curve 88), about 60% solids fraction (curve 90), and about 50% solids fraction (curve 92). FIG. 8 illustrates a decrease in viscosity with an increase in shear rate for all the solids fractions.

Figure 5:
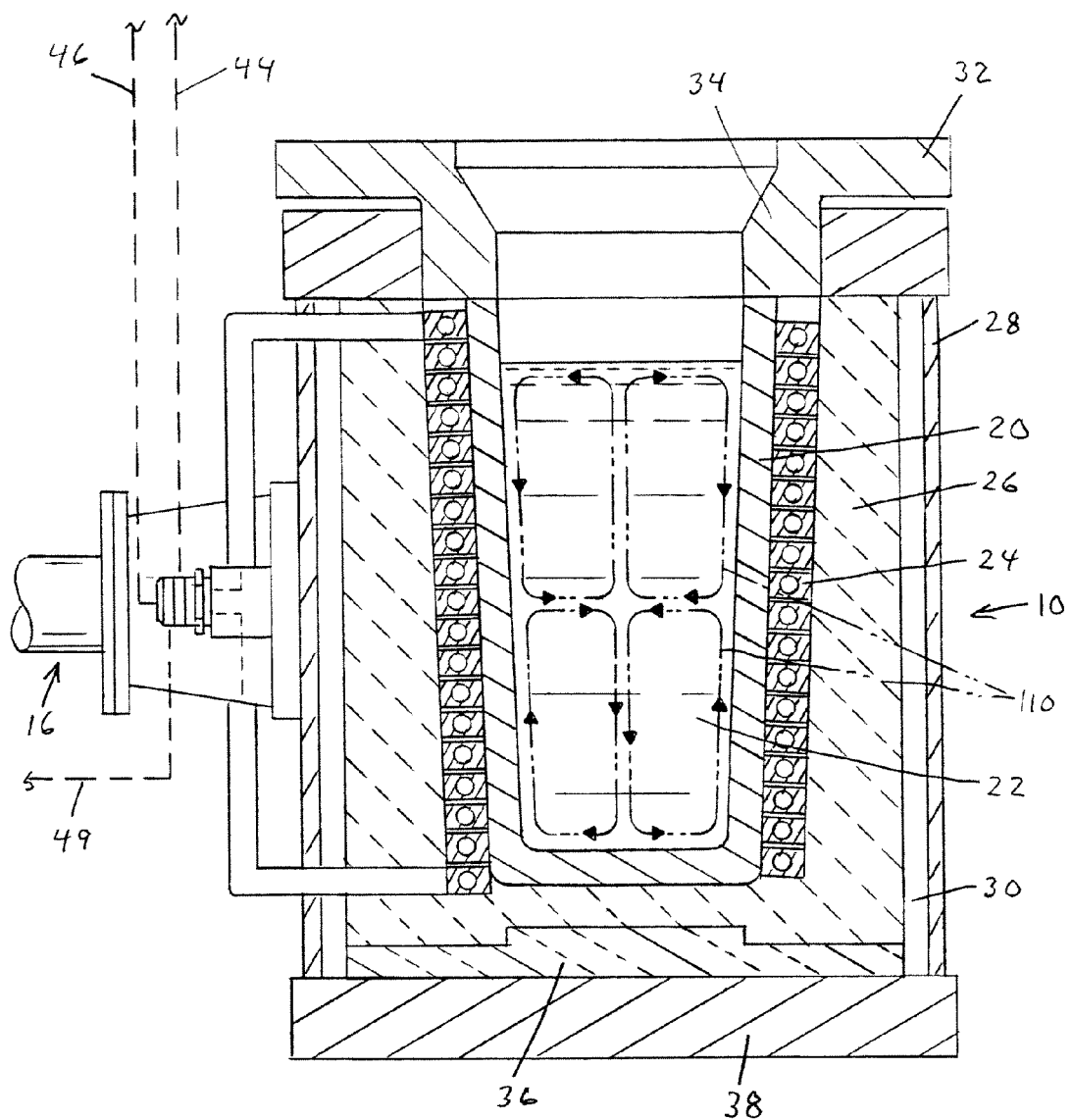
FIG. 5 is a schematic representation similar to FIG. 2 of the semi-liquid metal processing and sensing device, illustrating toroidal flow of the molten metal or metal alloy semi-liquid metal processing and sensing device.

Referring to FIG. 5, the alternating current not only heats charge 22, but the alternating current can also induce agitation or mixing of metal charge 22 in crucible 20. The mixing is not circumferential or circular about a vertical axis within crucible 20. Rather, the mixing action is toroidal, as illustrated by the flow vectors 100. This toroidal motion results in circulation of metal charge 22 in a vertical direction along the inside of the crucible wall both upwardly and downwardly from the mid-plane of the charge and returning through the axial center of the metal charge. This toroidal mixing is more efficient in producing homogeneity of the melt at the interior surface area of the crucible to the center of the melt at the vertical axis of the crucible than circumferential mixing which does not circulate material from the edge to the center, but only in layers about the central axis of the crucible.

Referring again to FIG. 1, generator 10 and the connecting induction power leads 44, 46 are affixed to a multi-axis (typically 3 or more axes) robotic or mechanical aim assembly 16. As can be appreciated, generator 10 does not have to be connected to any type of robotic or mechanical arm assembly. For instance, the generator can be mounted on a stationary stand, in close proximity to the receiving part (shot sleeve, with or without trough) of the die-casting/injection machine. When the SLM/SSM charge is ready for pouring into the shot sleeve, the generator 10 tilts to pour the charge into the shot sleeve, thus eliminating the need for a robotic device; however; this is not required. The arm assembly 16 illustrated in FIG. 1, when used, can be adapted to manipulate generator 10 to a position to receive a molten metal charge from a source 14 such as, but not limited to, a dosing furnace, a metal pump, or a ladle. This position of generator 10 is identified in FIG. 1 as position "A." It is anticipated that the metal charge 22 will have been preheated to a temperature at or above the liquidus temperature of the metal charge when the metal charge is poured into the generator. After the generator has received the metal charge, the arm assembly 16 can be designed to move generator 10 to a delivery point at the forming station while the SLM/SSM is created; however, this is not required. At the forming station, the arm assembly 16 can be designed to tilt generator 10 to deliver the metal charge 22 to the forming machine 18, or generator 10 can be adapted with a plunger or piston to inject the metal charge 22 into the forming machine 18. This position of generator 10 is identified in FIG. 1 as position "B." The induction power supply 42 can either be an integral part of the arm assembly 16, or located remotely. In either configuration, the metal charge 22 can be continuously processed to ensure that the temperature and viscosity, solids fraction, and/or laminar flow conditions of the metal charge are maintained at selected values. The metal charge in the generator can be continuously processed by a) monitoring the resistance of the load system and/or the resistivity of the metal charge and/or generator 10, b) adjusting the induction coil power and/or frequency, and/or c) adjusting the flow of coolant through induction coil 24 and/or cooling coils to cool the metal charge 20 in a highly controlled manner until the selected temperature and viscosity of the metal charge 20 are reached as indicated by the resistance and/or resistivity. The SLM/SSM processing and sensing device of the preset invention enables precise control of the rate of cooling and/or heating of the metal charge in the generator, and the accurate, repeatable determination of when the selected temperature and/or viscosity of the metal charge has been reached. Because of variations in the metal charge constituents, as illustrated in Table 1, and variations in the operational and structural configuration of generator 10, the relationship between resistivity, metal charge temperature and viscosity is generally determined empirically. This relationship is based in part on the empirical relationship between heat content and solids fraction as illustrated, for example, in FIGS. 3 and 7. The relationship between solids fraction and viscosity of the metal charge, as illustrated, for example, in FIGS. 6 and 7, can be derived from analysis of metallurgical samples and experimental data of a selected metal charge composition.

As briefly discussed above, the temperature and viscosity of the metal charge 20 in generator 10 can be determined empirically by comparison to resistivity and/or resistance measurements. This empirical relationship will now be discussed in more detail. The relationship of the resistance of the load (RL) of the induction coil to the temperature of the metal charge 22 in the generator can be based on information that is calculated by use of empirical methods. The basis of this method is the change in resistance of the metal charge (e.g., aluminum alloy in the generator) as reflected in the feedback response of a powered induction coil surrounding the generator. The powered induction coil positioned about the generator operates at some known alternating frequency (e.g., 10-10,000 Hz, 500-5000 Hz, etc.). Due to the alternating current flow in the conducting coil turns, an alternating magnetic field is established in the vicinity of the coil that induces an opposite current flow in the load material (e.g., metal charge 22 and generator, when the generator is formed of a conductive material). It is this rapidly changing current flow induced into the load material that generates heat and also physical forces that act upon the load, which, in the present case, cause a toroidal stirring effect in the molten metal charge in the generator. For instance, a Lorentz Force acts upon the metal charge in the generator, which force is derived from Equation $F=(J_{x,y} \times B)$. This force represents the repulsion between the applied current creating the magnetic field flux density, B, and the induced current, J, in the molten metal charge.

The induction coil used in the present invention is multifunctional since it is designed to both heat the metal charge in the generator and to also regulate the cooling of the metal charge in the generator. The cooling of the metal charge is accomplished by conduction with internal coil cooling water via the generator and any intermediate material used to electrically isolate the induction coil from the metal charge and/or crucible of the generator. As stated above, the induction coil also serves as a source of heat to the metal charge due to the generation of eddy currents directly in the metal charge from the creation of alternating magnetic fields, which is the typical application for induction technology. The simultaneous heating and cooling effects allow for a precise and instantaneous control of the heating and/or cooling rate of the metal charge in the generator.

An induction system consists of a power supply source, load matching/tuning means and coil that acts upon the conducting load. The typical low-medium frequency induction power supply (PS) first creates DC power by rectifying incoming 3-phase line power and then by employing an inverter that creates a 1-phase alternating power output. This alternating power source, to affect a high efficiency utilization of power, must be matched, or tuned to the load to create a resonance effect. At resonance in a tuned circuit, a relationship exists between the frequency f, the capacitance C, and the inductance L as follows: At resonance: $f=1/((2\pi)\cdot(L\cdot C)^{1/2})$. When tuned properly, the PS will have an output that will be at a fixed frequency. This reduces the impact of frequency variation on sensing and control. The frequency in an induction system also establishes the effective depth of the induced current penetration. The relationship is based on the following formula: Penetration depth/reference depth $\delta=3160(\rho/\mu f)^{1/2}$ inches; where $\rho$ is the resistivity of the metal charge, $\mu$ is the relative permeability of the metal charge, and f is the frequency of the alternating power source. For non-magnetic materials such as ceramics and non-ferrous metals, $\mu=1$. Although the actual field penetrates to the center of the metal charge, the induced current density is greatest at the surface of the metal charge or generator if formed of a conductive material, and decays exponentially such that the reference depth accounts for the major portion of the generated heat in the metal charge.

The magnitude of the voltage output from the PS to the induction coil determines the current flow in the coil turns. It is this alternating current that creates the alternating magnetic field. The actual power (kilowatts) at the coil is determined by the voltage, current and the power factor of the load circuit. The power is represented by the following formula: $Pc=Ic\cdot Vc\cdot \cos\theta$; where $\theta$ is the phase angle between the AC current and the voltage. The power factor, or phase angle is dependent upon the dynamic interaction of the tuning components, PS frequency, the induction coil & load material coupling (e.g., geometric relationship and material properties of the induction coil). At near resonance in the practical parallel LCR circuit, the load impedance is primarily governed by the resistance in the transmission lines, induction coil and metal charge and generator if formed of a conductive material, thus the capacitance part of the circuit has no pure resistance component. As such, $X_L$ and the associated resistance $R_L$ comprise the impedance relationship of interest. The portion of the circuit of interest in this case is the inductive branch of the circuit, at which, the response of the load can be measured. This relationship is governed by the following formulas: $I_C=V/R_L$; $P_C=I^2\cdot R_L$; and therefore $R_L=P_C/I^2$. As can be appreciated, if the frequency has a fixed value, then the only variables that will change are the resistance of the components that are affected by temperature and geometry, namely the load system (e.g., @ metal charge crucible and induction coil).

The voltage, current and power all change in response to changes in the material properties of the load system (metal charge, crucible and induction coil). These changes are typically temperature related as the load system heats up or cools down. The particular material property of the load system that is affected by temperature at the same time impacts the electrical characteristics of the load system is the resistivity $\rho$, which in turn is reflected in the resistance of the load system $R_L$. This relationship is represented by the following formula: $R_L=\rho\cdot(l/A)$; where l is the length of the load material, and A is the cross-sectional area of the material along length l. A is thus the cross-section of the conducing path represented by $A=\delta\cdot h_L$; wherein $\delta$ is the reference depth. The voltage, current and power are also sensitive to the amount and shape of the metal charge in the generator as it relates to the geometric coupling of the induction coil to the load system. Therefore the response of the voltage, current and power of the circuit can be used to determine what temperature changes have taken place in the load system by solving for $R_L$ and/or $\rho$.

Induction coils are commonly made from copper and are water-cooled. As such, the temperature changes in the induction coil are minimal; thus its resistivity is relatively stable and can be treated as a constant thereby having little impact on the electrical parameters. The grout or insulating material that can be used between the induction coil and crucible of the generator is typically a ceramic mixture that is stable and the resistivity values of such materials are at such a high value that they can be considered non-conductors and thus insignificant. The same principles can be applied to the crucible of the generator if the crucible is made from ceramic materials. However, if the crucible is a graphite material that is conductive, the crucible will have a resistivity value that changes with resulting temperature effects. The metal charge in the generator is not only influenced by conducted temperatures from the induction coil and generator, but the metal charge also generates its own internal inductive heat. The heat generated by the metal charge is dependent upon the operating temperature range of the metal charge and the frequency of the alternating magnetic field. The increase in heat generated in a graphite crucible is approximately 0.7% at a constant frequency of 1200 Hz, and over the temperature range of 550-650_C. Correspondingly, an aluminum alloy A356 increases its generated heat 39.0% over the same temperature range, with the same electrical, heating and physical conditions. Therefore the resistance contribution of a graphite crucible can be considered a constant over the temperature range of interest that is cited above. The changes in the properties (resistivity) of the metal charge in the generator due to temperature are reflected in the electrical feedback signals measured at the load coil. In the case of metals and metal alloys, there are phase transformations that occur during heating of the metal and metal alloy from a solid to the liquid condition, and also in the reverse cooling mode. The solid melting point (solidus temperature) and the liquid melting point (liquidus temperature) define the lower and upper temperatures of the melting range of the metal or metal alloy, respectively. In this range for multiphase, nonferrous alloys, these temperatures are often difficult to measure accurately and to use for sensing the degree of melting or fraction solid (fs) of the metal or metal alloy. In addition, most of these measurement methods depend on sensors in direct contact with the molten metal and are prone to damage and degradation over time, such as thermocouples. However, several other material properties change in a more normal or near-linear fashion in this range which can be translated/correlated to temperature values for the metal or metal alloy. Some of these material properties are fs, relative heat content (enthalpy) and resistivity of the metal or metal alloy. The relationships between heat content vs. temperature, fs vs. temperature, and resistivity vs. temperature can be used to monitor and/or determine several properties of the metal charge in the generator. By sensing the resistance ($R_{TOT}$) and/or resistivity from the electrical feedback of the induction coil, various parameters can be deduced regarding the metal charge in the generator. For example various induction principles can be used to sense and consequently control the (slurry) process in an indirect fashion. As such, an induction coil of one or more windings can be used to sense the electrical reaction response of a load independently of the heating/cooling coil. A separately wound coil, typically of fine insulated wire, cooled or un-cooled can be placed in close proximity to the load container such that it is able to be influenced by the field induce in the load by the main heating/cooling coil; however, this is not required. This arrangement is called "eddy current" sensing. The sensing coil can be powered independently or unpowered and the generated feedback signals can be used in the same fashion as in the coupled case arrangement as discussed above to establish the condition of the load material.

A specific non-limiting process control system in accordance with the present invention will now be described. The process control system can include the use of an Ajax TOCCO Magnethermic "Coil Monitor" unit, a current transducer and potential transformers (PT) for measuring voltage. A current transducer (CT) can be connected to one of the leads supplying the 1-phase high frequency power to the induction coil. The leads from the PT's can be connected directly to the induction coil; one set across all of the induction coil turns and the other set across half of the induction coil turns on the bottom half of the induction coil. The signals from the CT and the first PT can be connected as inputs to the coil monitor unit. As can be appreciated, other configurations can be used in accordance with the present invention.

The metal charge that is to be introduced into the crucible of the generator is maintained in a melting/holding furnace. This melting/holding furnace is designed to hold a repeatable and accurate temperature (±3.0_C) from a temperature set point. When the metal charge is inserted into the crucible, the power level of the induction coil about the generator (P initial) is such that the metal charge in the crucible does not immediately begin to cool, and the power level of the induction coil is such that it induces forces into the molten metal charge to cause a toroidal stirring action of the metal charge in the crucible. The stirring action is believed to be important in creating a homogeneous melt from the edge of the crucible to the center of the molten metal mass.

The setting for the power from the PS is reduced (P cooling) to the induction coil to cause the cooling capacity of the load system to overcome the heating capacity of the induction system, thereby causing the metal charge in the crucible to begin to cool. The metal charge continues to be stirred during the cooling process since power is still being applied by the induction coil to the metal charge. During the cooling process, the metal charge begins to cool rapidly from the molten phase to the semi-liquid/solid phase, thus passing through the liquidus temperature of the metal charge. Since the liquidus temperature is at the phase transition between the fully liquid/molten metal charge and the initiation of solidification of the metal charge, solid particles of high melting point constituents begin to nucleate and disperse via stirring into the homogeneous mass. This mass particle nucleation takes place due to the rapid cooling rate in the presence of the stirring of the metal charge. Typically, in molten metal alloy systems, dendritic crystal growth occurs when the alloy is in contact with a cooled stationary surface, where stirring is not present in the molten metal bath. The formation of dendritic structure thus reduces the ability of the material to flow at these temperatures and fs levels, and thus increases the force required to move the material into a mold to form a cast part. In contrast, in the slurry system form by the process of the present invention, the creation of individual, free moving, individual partially rounded particles are beneficial to semi-solid slurry material flow since they allow the mass to exhibit a lower viscosity than dendritic material and require less force to move the material into a mold.

The monitoring of the generator can be accomplished by monitoring the single phase, high frequency AC electrical current and voltage feedback from the induction coil and converting the feedback to 0-5 VAC signals by the CT and PT units. These signals can then be inputted to the Ajax TOCCO Magnethermic "Coil Monitor" unit wherein the signals are multiplied to provide a true power signal, compared to an apparent power so as to determine the phase relationship, and then output as scaled 0-10 Vdc signals for Coil Current (Ic), Voltage (Vc) and true Power ($P_T$). This relationship is set forth by the following two formulas: $P_T=(Ic \cdot Vc) \cdot \cos\theta$, wherein $\theta$ is the phase angle between the high frequency AC voltage and current phasors; and $P_{app}=(Ic \cdot Vc)$, wherein (Ic) and (Vc) are the scalar values of voltage and current at the induction coil. The output signals from the Ajax TOCCO Magnethermic "Coil Monitor" unit can be connected as analog inputs to the System Programmable Logic Controller (PLC). In the control program, the measured true power seen at the induction coil ($P_T$) is divided by the square of the measured value of induction coil current ($Ic^2$). This value yields a value for R ($R_{TOT}=P_T/Ic^2$). The equivalent resistance of the load is calculated by the following formula: Reql=Rtot−Rc−Rcr−Rb, wherein Re is the resistance of the coil, Rcr is the resistance of the crucible, and Rb is the resistance of the coil buss. The actual load resistance of the system is calculated by the following formula: R Load=Reql/$N^2$, wherein N is the number of coil turns of the induction coil. The resistivity of the load of the system is calculated by the following formula: $\mu l=[(Reql \cdot hl \cdot 3160)/(2 \cdot \pi rl \cdot N^2)]^2 \cdot 1/f$, wherein hl is the length of the load, $\pi$ is the mathematical value of Pi, and f is the current frequency to the induction coil. The ($R_{TOT}$) value has been found to correlate well with the resistivity value $\rho$ (load). This correlation is illustrated in FIG. 9.

Figure 9:
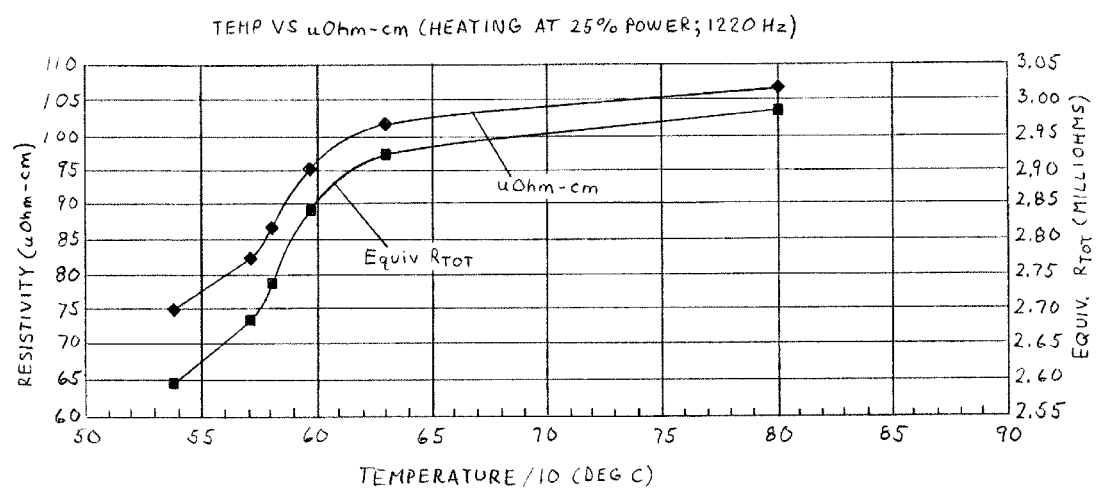
FIG. 9 is a graph illustrating the relationship between temperature versus resistivity data and temperature versus the total resistance in an induction coil.

As illustrated in FIG. 9, the $R_{TOT}$ data, which is represented by the lower line, is very similar to and creates a very similar curve as the $\rho l$ data, which is represented by the upper line. Indeed, the results measured correlate well with the values calculated. The result of the calculation of the measured values R ($R_{TOT}$) is a resistance feedback signal that is repeatable cycle to cycle and that can be used as a control parameter for heating and cooling of the metal charge in the generator.

Figure 10:
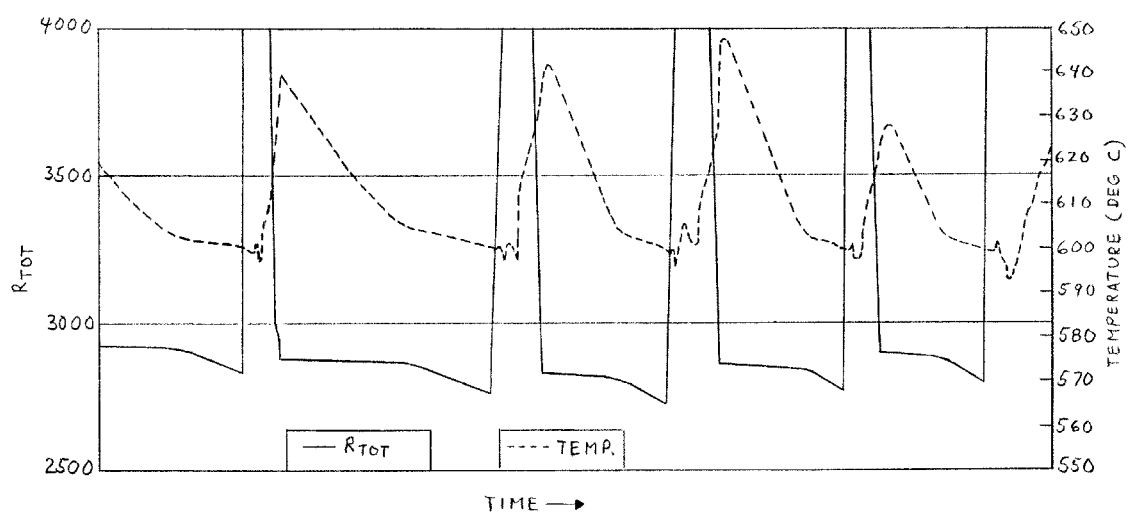
FIG. 10 is a graph illustrating the relationship between temperature and the actual load on the induction coil during a certain time period.

FIG. 10 illustrates the liquidus relationship of the metal charge. Specifically, FIG. 10 illustrates the $R_{TOT}$ and corresponding temperatures. The behavior of the measured $R_{TOT}$ value as the metal charge cools in the generator from the liquid phase to the semi-solid region appears as a slight, negative constant rate of change from a higher liquid value corresponding to the liquid alloy temperature. As the metal charge material cools, it reaches the liquidus temperature, wherein nucleation of solid particles begins to take place. Also at the liquidus temperature, the $R_{TOT}$ value changes from a slight slope to a more pronounced negative slope value. The reason for this is that the metal charge load is cooling from a region of low resistivity change per change in temperature into a region where the resistivity changes are more significant per change in temperature. Since the metal charge load is the only item in the system that is drastically changing, the other components of the process system are either remaining constants or are slightly changing in a generally linear fashion. As such, the measure changes are primarily due to the metal charge temperature and consequent resistance change.

The use of this "R Load" or "$R_{TOT}$" signal for control takes place in the PLC. The calculated "R Load" or "$R_{TOT}$" signal can be tracked as a first derivative with respect to time. When the liquid metal charge is initially poured into the crucible of the generator, the value of the power to the induction coil is reduced to a predetermined value allowing the metal charge in the crucible to begin to cool. A few seconds is typically allowed for the signal to stabilize and for the establishment of the d(R)/dt value and the monitoring of this value. When the metal charge cools to the liquidus temperature, the temperature rate of change reduces as the material becomes semi-solid. Correspondingly, the resistance signal changes as well. However, the resistance change is such that the d(R)/dt decreases. This change in resistance at the liquidus temperature can be used in the control scheme as an initial reference point for determining the degree of semi-solid condition, fs, and control requirements; however, this is not required.

The PLC can be programmed to perform an iterative time and magnitude gate check of the signal as the resistance change occurs. This check can function as verification that the change seen is real and not a response to random signal noise (variation). The verified "R Load" or "$R_{TOT}$" signal can be measured and continues to decrease in value until a preset $\Delta R = (R_{LIQ} - R)$ is achieved. The preset R value can be chosen as representative of the desired fraction solid of the metal charge for the subsequent forming operation. As can be appreciated, the value of the resistance feedback, which reflects the temperature/fs, is prone to some degree of variation during the cooling of the metal charge.

The resulting variation in cycle time of the cooling of the metal charge in the generator will introduce downstream variations in the forming process, and consequently introduce potential problems relating to part quality and defects that are formed in the forming machine. A correction process can be performed in the PLC which measures the feedback signal dR/dt and calculates the real projected cycle time and then compares this value to the target cycle time. Based on this projected time, a new cooling power level can be determined and entered into the high frequency power supply. As a result of this correction, a cooling rate that arrives at the Target Cycle time as the R value reaches the preset $R_{TARGET}$ can be achieved so as to not impede the delivery of the metal charge from the generator to the forming machine.

An additional active control can be used to assist in achieving repeatable cycle time, such as a "Hold" segment of the PLC prop-am. If the $R_{TARGET}$ value is achieved before the cycle time window is completed, then the program can be designed to perform an internal PID control with the target value ($R_{TARGET}$) as a set-point. The control will maintain the target R value until the cycle time is complete. When the $R_{TARGET}$ and Cycle Time conditions are satisfied, the signal to pour is given to the process system and the tilt mechanism pours the contents of the generator directly into the receiver or shot sleeve of the forming device. The forming device could be a die cast machine (either a horizontal or a vertical unit), gravity semi-permanent mold machine, sand mold or other configuration. Generally a die cast machine is used which can benefit from the slurry charge control and short cycle times, which can lead to increased productivity. At the same time as productivity increases occur, the quality of the product will be improved by the high fs structure of the slurry material.

Figure 11:
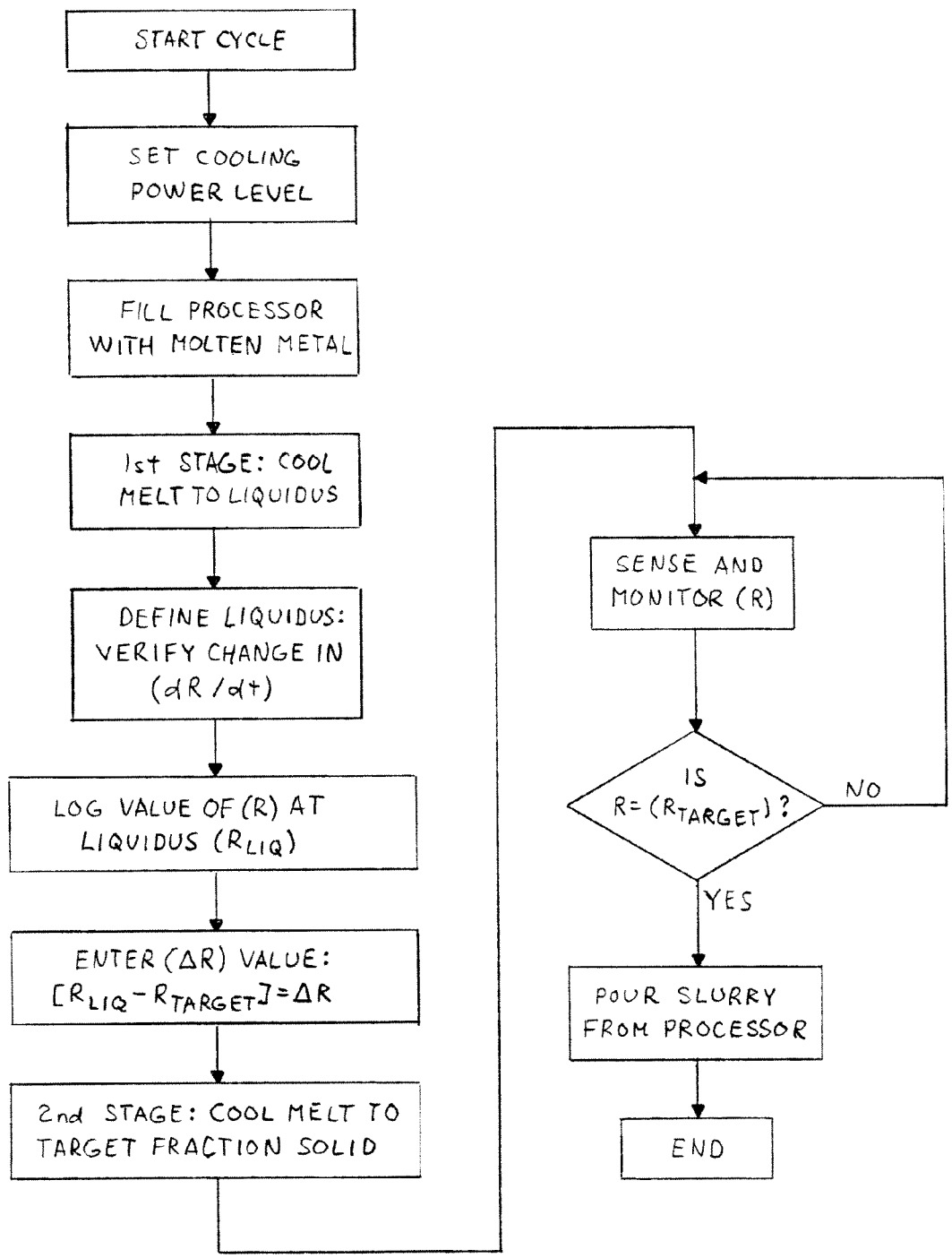
FIG. 11 is a process flow diagram illustrating one non-limiting process arrangement in accordance with the present invention; and, FIG. 12 is a non-limiting simple process illustration for processing a metal charge in accordance with the present invention.

Referring now to FIG. 11, there is illustrated a process flow diagram illustrating one non-limiting process arrangement in accordance with the present invention. The first step of the control process is to start the process cycle. The next step is to set the cooling power level for the induction coil. The next step is to fill the crucible of the generator with a molten metal charge. At the time the crucible is being filled with a molten metal charge from a furnace, the power level to the induction coil is sufficient to prevent the temperature of the molten metal charge from dropping below the liquidus temperature of the metal charge; however, this is not required. Generally, the power level for the induction coil is initially set so there is very little temperature drop in the molten metal charge as the molten metal charge is transferred from the furnace to the crucible in the generator. Once the crucible is filled to a desired level with the molten metal charge, the next process step illustrated in FIG. 11 is to cool the metal charge in the crucible to the liquidus temperature of the metal charge. For each type of metal or metal alloy that constitutes the metal charge, there is a specific liquidus temperature for such charge. The resistivity of the metal charge at the liquidus temperature is indicated in the flow diagram as $R_{liq}$. During the cooling process of the metal charge to the liquidus temperature, the resistance of the load inside the induction coil (e.g., metal charge plus the crucible, if the crucible is formed of a conductive material) is sensed (R), and can be recorded. The $1^{st}$ derivative of the sensed resistance (R) with respect to time is monitored The trend of this $1^{st}$ derivative in the fully molten phase of the alloy is slightly positive. When the liquidus point of the alloy is reached, the $1^{st}$ derivative of reflected R trends negative. The change in the derivative is verified by the programming of several gate conditions in the PLC which determine beyond any signal noise that the liquidus point has been reached. Once it has been verified that the metal charge in the crucible has reached the liquidus temperature, the second stage of the process begins wherein the metal charge is cooled below the liquidus temperature, but above the solidus temperature. A new load resistance set point $R_{target}$ is calculated in the control system. A preset value of a $\Delta R$ is used along with the $R_{liq}$ to determine the $R_{target}$. $R_{target}$ is relative to the sensed value of $R_{liq}$. This new Load resistance set point $R_{target}$ represents a certain temperature for the metal charge wherein the metal charge has a certain solids fraction and liquid fraction that is desirable for delivery to a casting or forming machine. The power level to the induction coil can be adjusted or read from the PLC during the second stage of the cooling of the metal charge so that the metal charge is at the desired temperature and includes the solids fraction and liquid fraction at the time the metal charge is to be delivered to the casting or forming machine. As such, the power level to the induction coil may have to be 1) further reduced to increase the cooling rate of the metal charge in the crucible, and/or 2) increased to slow the cooling rate of the metal charge in the crucible. As can be appreciated, the power level to the induction coil can be adjusted one or more times during the second stage of the cooling of the metal charge so as to meet the target time the metal charge is to be delivered to a casting or forming machine. During the second cooling stage the resistance of the induction coil load is sensed (R), and can be recorded. The sensed resistance is then compared to the second resistance set point $R_{target}$. If the detected resistance R is equal to $R_{target}$, then the metal charge is determined to be at the desired temperature and have the desired liquid and solids fraction, thus can be poured into or otherwise deposited into a casting or forming machine. If the casting or forming machine is not ready to accept the metal charge, the process system of the present invention can be designed to maintain the metal charge in the crucible at $R_{TARGET}$ until the casting or forming machine can accept the metal charge. If the sensed resistance of the induction coil load is not equal to the resistance set point $R_{TARGET}$, the power level to the induction coil is decreased, increased or maintained to cause the sensed resistivity R to approach $R_{TARGET}$. Various mathematical techniques can be used to determine the rate at which the sensed resistance, R is approaching $R_{TARGET}$ and whether the trend of the sensed resistance R to $R_{TARGET}$ over time is correct or requires adjustment by changing the power level to the induction coil. As illustrated in the process flow diagram, the sensed resistance, R is compared to $R_{TARGET}$ until the two values are the same. It is intended that the methods of programming the control for this process ideally enable the $R_{TARGET}$ condition of the material to be reached concurrently with the desired cycle time of the forming machine. Once the metal charge is poured or otherwise deposited into a casting or forming machine, the control process is complete and a new process can be started.

Figure 12:
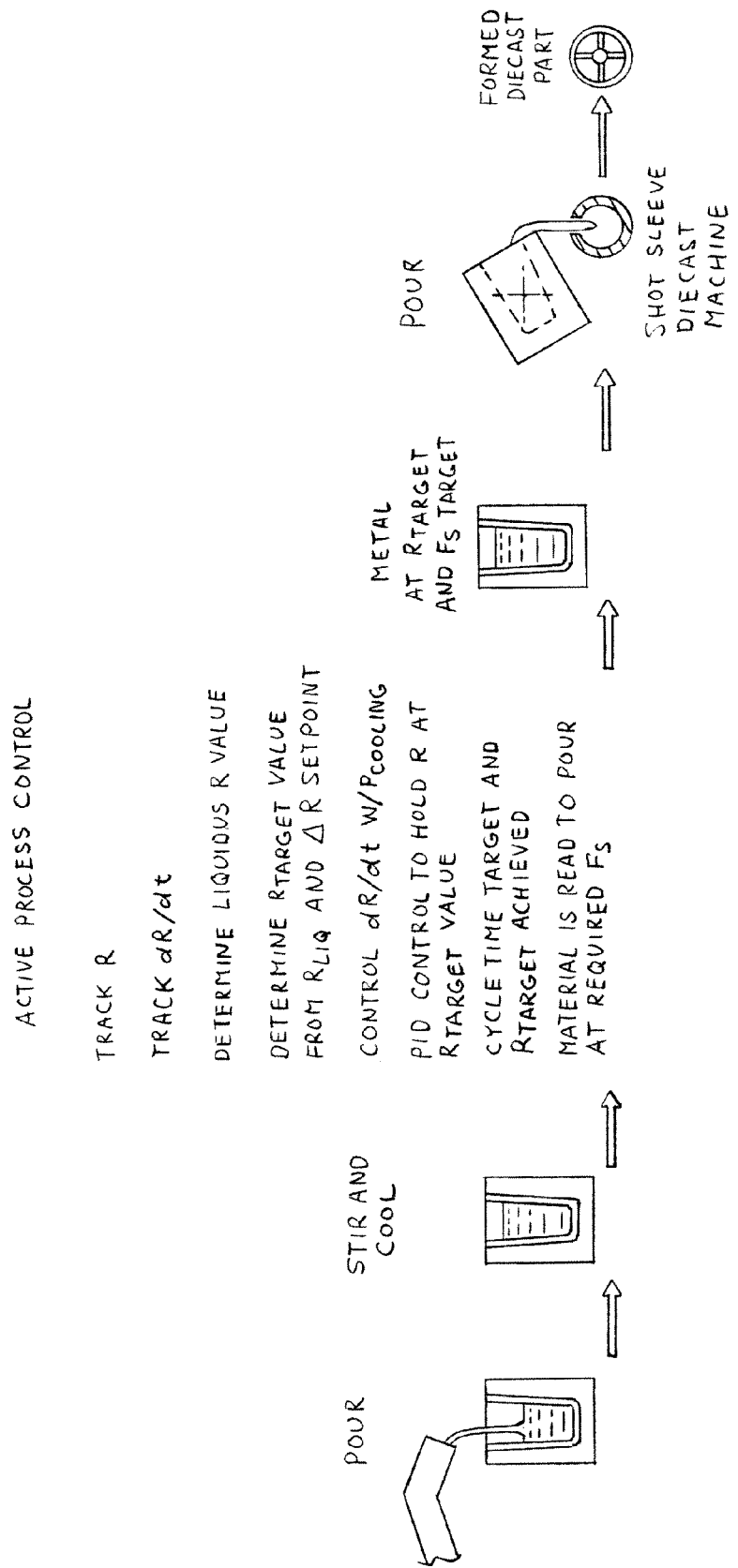

Referring now to FIG. 12, there is illustrated a non-limiting a simplified illustration for processing a metal charge in accordance with the present invention. The first picture illustrates a molten metal charge being poured into a crucible of a generator. The temperature of the metal charge at this point is above the liquidus temperature. The manner in which the metal charge is conveyed to the crucible from the furnace is not limiting. The type of furnace used to melt the metal charge is also not limiting. Once the metal charge is deposited into the crucible, the metal charge is stirred and cooled until the metal charge reaches the liquidus temperature of the metal charge. This process step is the same or similar to the first stage of cooling as discussed above with regard to the process flow diagram illustrated in FIG. 11. From the time that the metal charge is deposited in the crucible to the time that the metal charge is removed from the crucible, a process control system is used to control the cooling rate of the metal charge in the crucible, temperature of the metal charge in the crucible, and solid and liquid fraction of the metal charge in the crucible. One non-limiting example of a process control system that could be used is illustrated in FIG. 11. This process control system is illustrated as Active Process Control in FIG. 12. In one non-limiting arrangement, the Active Process Control includes the use of (3) preset values for the high frequency power to the induction coil, namely 1) a preset value at the time the metal charge is poured into the crucible, 2) a preset value for the cooling cycle of the metal charge in the crucible, and 3) a preset value for the metal charge at the time the metal charge is to be removed from the crucible. The Active Process Control can include several modes of operation. One operation mode is a Cycle Time Target Mode that is used to identify the cooling rate (dR/dt) after the metal charge has been cooled to its liquidus temperature. The Cycle Time Target Mode is designed to change the cooling power to the induction coil to allow the $R_{TARGET}$ to be achieved at same time as the Cycle Time Target. Another operation mode is a Hold Mode. The Hold Mode is designed to allow the $R_{TARGET}$ value to be held constant by varying the cooling power to the induction coil via a PLC based PID control loop until the Cycle Time Target is reached. Another mode is a Charge Level Sensing 1 Mode. This Charge Level Sensing 1 Mode is designed to enable a determination of the amount of metal charge in the crucible after being poured into the crucible. Since the value of "R Load" or "$R_{TOT}$" is stable and relatively constant during the liquid phase cooling of the metal charge; the amount of metal charge in the crucible will change the metal charge geometry such that the "R Load" or "$R_{TOT}$" signal level can reflect the amount of metal charge in the crucible. The PLC, based on the level of "R Load" or "$R_{TOT}$", can either accept the metal charge as within process limits, abort the cycle if the metal charge is too much or too little material to obtain a repeatable, quality forming operation. Another mode is a Charge Level Sensing 2 Mode. The Charge Level Sensing 2 Mode is designed to utilize the same metal charge level sensing logic as the Charge Level Sensing 1 Mode. The Charge Level Sensing 2 Mode is designed to make a decision, based on empirical data of dR/dt versus volume at a given power level and melt temperature, whether to set the cooling power of the induction level up-or-down to project a reasonable target time for $R_{LIQ}$ to occur, or the entire Cycle time target to occur. Another mode is a Melt Temperature Compensation Mode. The Melt Temperature Compensation Mode is designed to determine an initial cooling power level based on the incoming temperature of the liquid metal charge. If the liquid metal charge is cooler than the set-point value, a proportional power adjustment up will be set to allow $R_{LIQ}$ to occur in an acceptable time window, and the total cycle time to occur in a reasonable time window. This mode keeps all of the other control modes from enabling drastic power changes for their compensation actions. One or more of these modes can be used in the Active Process Control of the present invention. As can be appreciated, other or additional control modes can be used in the present invention. Once the metal charge in the crucible is at $R_{TARGET}$ and the $fs_{TARGET}$, the metal charge can be poured or otherwise ejected from the crucible into a shot sleeve or other receptacle of a die cast or forming machine as illustrated in FIG. 12. The metal charge is then formed into a die cast part. The crucible can be refilled with a new molten metal from the furnace and the Active Process Control can be repeated for the new metal charge.

As discussed above, generator 10 can be designed to perform one or more of the following functions:

Continual sensing or periodic sensing of the condition of the SLM/SSM beginning with the introduction of the molten metal charge 22 into generator 10 and ending with the delivery of the processed SLM/SSM into a forming machine, i.e., a shot sleeve, a sprue, a funnel, and the like.

Control of the cooling, heating, and/or agitation of the SLM/SSM to ensure that the material delivered to the forming machine is of repeatable, consistent thermal, micro-structural, and/or viscous condition.

Transfer of the metal charge 22 to a forming device directly from generator 10 without an intervening container or transfer step. Generator 10 can be mechanically uncoupled from either the molten metal source and/or the forming machine; however, this is not required.

A non-limiting feature of generator 10 is the ability to remotely sense the condition of the SLM/SSM charge, and/or to control the heating and/or cooling process based on feedback from the non-contact sensing apparatus, i.e., the induction coil 24. Additionally or alternately, a feedback signal can be obtained from a second, unpowered coil (not shown) in close proximity to the molten metal charge 22. The induction power unit can comprise a controller 40 as illustrated in FIG. 1 that is adapted with signal conditioning electronics designed to continuously or periodically monitor the load from the induction coil and/or unpowered coil. In most cases, the load will comprise the induction coil 24 and the conductive material monitored by the coil 24. The conductive material can comprise the SLM/SSM charge 22 in the crucible 20, and can additionally comprise the crucible 20 itself if the crucible material is conductive, e.g. graphite or metal. In another and/or alternate non-limiting embodiment, generator 10 can be configured with an induction coil that is "tapped" at selected locations along its length; however, this is not required. This configuration enables selected portions of the coil to be selectively energized in order to provide an additional degree of control to generator 10. Specifically, the portion of the coil energized can be selected based upon the size of the metal charge, with shorter lengths of the coil energized for smaller amounts of metal charge in the crucible. In yet another and/or alternative non-limiting embodiment, different generators 10 having different coil lengths can be utilized for metal charges of different mass; however, this is not required.

Electrically sensed changes in the load are due to thermal changes and metallurgical changes in the molten metal charge as it either cools or heats. One of the changes is a resistivity change in the metal charge that produces a change in the induction coil voltage. This voltage can be used as a feedback signal to control the heat/cooling process of the metal charge in the crucible. Using the signal conditioning features in the induction control system, this voltage and/or other available signals reflecting the metal charge condition can be used to modulate and control the physical process of cooling, heating, and/or maintaining the condition of the metal charge in the generator. Many induction control systems have the added ability to generate and track a signal even when modulating the power output. Therefore, control of the SLM/SSM process can be designed to be continuous, non-contact control system (i.e., no thermocouple required in the metal charge and/or crucible wall), and/or be capable of adjustment to a desired operating point while delivering the metal charge to the forming station.

Another non-limiting embodiment of the device and its application is the use of generator 10 in conjunction with other SSM/SLM production methods. For example, generator 10 can be operably combined with a device that can initiate the nucleation process. Generator 10 can be utilized to maintain a homogeneous melt temperature. After nucleation, the nucleated SLM/SSM mixture can be further cooled and maintained at controlled delivery conditions by generator 10.

Generator 10 also can be designed to control the delivery of the metal charge 22 in a carefully controlled condition to the forming station 18. Depending on the design of the forming machine, and its charge receptacle, generator 10 can either be tilted to pour the metal charge into a vertically or horizontally oriented shot sleeve, such as typically used in a die-cast machine, or a low-pressure permanent mold forming device. In a forming process that requires the metal charge to be highly viscous, similar to an SSM billet, the metal charge can be processed in generator 10, and the generator can deliver the metal charge into a specialized sleeve adapted to receive the more highly viscous SLM/SSM shaped billet (e.g., cylindrical shaped billet, etc.). Generator 10 can be adapted with bottom-sealed refractory or a metal piston that can function as a physical plunger to eject the metal charge 22 from the crucible 20, and be coupled with a hydraulic cylinder to function as an integral shot rod and plunger tip; however, this is not required.

Because the generator 10 is induction powered, any unintended cooling or freezing that might occur in the crucible 20 can be melted out. The ability of generator 10 to heat can also be utilized to prevent the accumulation of solidified oxide skins or skulls in the crucible 20, which skins and skulls can cause product defects such as pre-solidified inclusions. The capability of the Generator 10 to "self clean" without the use of a separate physical contact device is very advantageous.

An alternate non-limiting embodiment of generator 10 is that it can be part of a fully coupled unit. A coupled generator can be adapted to accept a metered metal charge though a heated transfer tube directly from a dosing furnace or molten metal pump. The molten metal charge can be designed to pass through a generator wherein the metal charge is cooled and agitated as in the above-described generator. The induction coil can be a single solenoid coil powered by a single frequency generator, or triple-wound independent coil supplied by a three phase frequency induction generator to enhance metal movement through the generator portion. The metal charge can be maintained in the generator portion at a controlled condition. When the process cycle calls for SLM/SSM to be injected, the metal supply device (e.g., pump or dosing unit) is actuated, and the generator portion allows or causes the metal charge to proceed to a heated conduit and into a forming or injection chamber as a new volume of molten metal is introduced into the generator portion. This method is suitable for a dedicated forming station that produces SLM/SSM parts exclusively.

The semi-liquid metal processing and sensing device of the present invention provides the ability to precisely control the cooling and/or holding process for a metal charge in the generator by cooling rate and end condition, which enables the delivery of a SLM/SSM charge in a repeatable fashion to a forming device, even in the event of a cycle delay or production interruption. This arrangement is a unique feature of generator 10 that is not currently available from prior art SLM/SSM devices.

Generator 10 can be designed to be relatively easy to operate, and not require extensive training, and/or be capable of delivery of repeatable, consistent metal charge to a forming station. The non-contact sensing and control, as well as the ability to fully control the thermal behavior of the metal charge in the generator enables a highly efficient and effective production process. Generator 10 can be readily incorporated into a production line, and can be designed to be easy maintained by simply exchanging generator units on the robot arm.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

I claim:

1. A method of monitoring, determining, controlling, or combinations thereof at least one property at least one property of a molten or semi-molten material in a material container that is subjected to a magnetic field formed by at least one induction coil to control a cooling rate of said material in said material container, said method including:
    inserting said molten or semi-molten material in a cavity of said material container, said cavity at least partially encircled by at least one induction coil;

applying power to said at least one induction coil, said at least one induction coil functions as a heating device, a cooling device, or combinations thereof of said material;

directly sensing, indirectly sensing, or combinations thereof at least one electrical parameter as said power is applied to said at least one induction coil, said sensing of said at least one electrical parameter is obtained from i) feedback from said at least one induction coil, ii) information from a solenoid coil in proximity to said at least one induction, or combinations thereof; and, determining at least one selected from the group consisting of a load resistance inside a region at least partially encircled by said induction coil, a resistivity of said material, a temperature of said material, a solid fraction of said material, a liquid fraction of said material, and combinations thereof based at least partially on said sensed at least one electrical parameter to control a cooling rate of said material in said material container.

2. The method as defined in claim 1, including the step of using said sensed electrical parameter to at least partially control said material temperature, solid fraction of said material, said liquid fraction said material, or combinations thereof in said material container.

3. The method as defined in claim 2, wherein said material is inserted in said material container at a temperature above a solidus temperature of said material.

4. The method as defined in claim 3, wherein said material is pure aluminum or an aluminum alloy, said aluminum alloy including at least 77.55 weight percent aluminum and at least two metals selected from the group consisting of copper, iron, magnesium, manganese, nickel, silicon, tin, titanium and zinc.

5. The method as defined in claim 1, wherein said material is at least partially stirred in said material container by a magnetic field generated by said at least one induction coil.

6. The method as defined in claim 1, including the step of using said sensed at least one electrical parameter to at least partially control a power level to said at least one induction coil.

7. The method as defined in claim 6, wherein said step of controlling said power level is used to control a reduction of said temperature of said material to a temperature greater than a solidus temperature of said material so that said material has a certain solid fraction and liquid fraction just prior to a time said material is poured from or otherwise ejected from said material container.

8. The method as defined in claim 1, including the step of continuously or periodically monitoring said sensed at least one electrical parameter while said material is in said material container to track a temperature trend of said material in said material container.

9. The method as defined in claim 1, including the step of determining a derivative of said sensed at least one electrical parameter as a function of time and using said derivative to at least partially determine a temperature trend over time of said material in said material container.

10. The method as defined in claim 1, including the step of setting a target electrical parameter and controlling said power level to said at least one induction coil so that said temperature of said material in said material container obtains a certain temperature to cause said sensed at least one electrical parameter to equal said target electrical parameter.

11. The method as defined in claim 1, including the step of setting a target cycle time and controlling said power level to said at least one induction coil so that said temperature of said material in said material container obtains a certain temperature in a time period that is equal to said target cycle time, said target cycle time can be a set or adjustable value.

12. The method as defined in claim 1, including the step of depositing said material in a forming or casting machine alter said material in said material container has reached one selected from the group consisting of a desired temperature, solids fraction, and combinations thereof.

13. A method of monitoring, determining, controlling, or combinations thereof at least one property of a molten or semi-molten material that is subjected to a magnetic field formed by at least one induction coil, said method including:

inserting said material in a cavity of a material container, said cavity at least partially encircled by at least one induction coil, said material is inserted in said material container at a temperature above a solidus temperature of said material;

applying power to said at least one induction coil, said at least one induction coil functions as a heating device, a cooling device, or combinations thereof of said material;

directly sensing, indirectly sensing, or combinations thereof at least one electrical parameter as said power is applied to said at least one induction coil, said sensing of said at least one electrical parameter is obtained from at least one selected from the group consisting of i) feedback from said at least one induction coil, ii) information from a solenoid coil in proximity to said at least one induction coil, and combinations thereof:, and, determining at least one selected from the group consisting of load resistance inside a region at least partially encircled by said induction coil, a resistivity of said material, a temperature of said material, a solid fraction of said material, a liquid fraction of said material, and combinations thereof based at least partially on said sensed at least one electrical parameter.

14. The method as defined in claim 13, wherein said material is at least partially stirred in said material container by a magnetic field generated by said at least one induction coil.

15. The method as defined in claim 14, including the step of using said sensed at least one electrical parameter to at least partially control a power level to said at least one induction coil.

16. The method as defined in claim 15, wherein said step of controlling said power level is used to control a reduction of said temperature of said material to a temperature greater than a solidus temperature of said material so that said material has a certain solid fraction and liquid fraction just prior to a time said material is poured from or otherwise ejected from said material container.

17. The method as defined in claim 16, including the step of continuously or periodically monitoring said sensed at least one electrical parameter while said material is in said material container to track a temperature trend of said material in said material container.

18. The method as defined in claim 17, including the step of determining a derivative of said sensed at least one electrical parameter as a function of time and using said derivative to at least partially determine a temperature trend over time of said material in said material container.

19. The method as defined in claim 18, including the step of setting a target electrical parameter and controlling said power level to said at least one induction coil so that said temperature of said material in said material container obtains a certain temperature to cause said sensed at least one electrical parameter to equal said target electrical parameter.

20. The method as defined in claim 19, including the step of setting a target cycle time and controlling said power level to said at least one induction coil so that said temperature of said material in said material container obtains a certain temperature in a time period that is equal to said target cycle time, said target cycle time can be a set or adjustable value.

21. The method as defined in claim 20, including the step of depositing said material in a forming or casting machine alter said material in said material container has reached one selected from the group consisting of a desired temperature, solids fraction, and combinations thereof.

22. A method of monitoring, determining, controlling, or combinations thereof at least one property of a molten or semi-molten material that is subjected to a magnetic field formed by at least one induction coil, said method including:
inserting said material in a cavity of a material container, said cavity at least partially encircled by at least one induction coil, said material is pure aluminum or all aluminum alloy, said aluminum alloy including at least 77.55 weight percent aluminum and at least two metals selected from the group consisting of copper, iron, magnesium, manganese, nickel, silicon, tin, titanium and zinc;
applying power to said at least one induction coil, said at least one induction coil functions as a heating device, a cooling device, or combinations thereof of said material;
directly sensing, indirectly sensing, or combinations thereof at least one electrical parameter as said power is applied to said at least one induction coil, said sensing of said at least one electrical parameter is obtained from i) feedback from said at least one induction coil, ii) information from a solenoid coil in proximity to said at least one induction coil, or combinations thereof, and,
determining at least one selected from the group consisting of a load resistance inside a region at least partially encircled by said induction coil, a resistivity of said material, a temperature of said material, a solid fraction of said material, a liquid fraction of said material, and combinations thereof based at least partially on said sensed at least one electrical parameter.

23. The method as defined in claim 22, wherein said material is at least partially stirred in said material container by a magnetic field generated by said at least one induction coil.

24. The method as defined in claim 23, including the step of using said sensed at least one electrical parameter to at least partially control a power level to said at least one induction coil.

25. The method as defined in claim 24, wherein said step of controlling said power level is used to control a reduction of said temperature of said material to a temperature greater than a solidus temperature of said material so that said material has a certain solid fraction and liquid fraction just prior to a time said material is poured from or otherwise ejected from said material container.

26. The method as defined in claim 25, including the step of continuously or periodically monitoring said sensed at least one electrical parameter while said material is in said material container to track a temperature trend of said material in said material container.

27. The method as defined in claim 26, including the step of determining a derivative of said sensed at least one electrical parameter as a function of time and using said derivative to at least partially determine a temperature trend over time of said material in said material container.

28. The method as defined in claim 27, including the step of setting a target electrical parameter and controlling said power level to said at least one induction coil so that said temperature of said material in said material container obtains a certain temperature to cause said sensed at least one electrical parameter to equal said target electrical parameter.

29. The method as defined in claim 28, including the step of setting a target cycle time and controlling said power level to said at least one induction coil so that said temperature of said material in said material container obtains a certain temperature in a time period that is equal to said target cycle time, said target cycle time can be a set or adjustable value.

30. The method as defined in claim 29, including the step of depositing said material in a forming or casting machine after said material in said material container has reached at least one selected from the group consisting of desired temperature, solids fraction, and combinations thereof.

31. A method of monitoring, determining, controlling, and combinations thereof of at least one property of a molten or semi-molten material that is subjected to a magnetic field formed by at least one induction coil to control a cooling rate of said molten or semi-molten material in a material container, said method including:
inserting said molten or semi-molten material in a cavity of said material container, said cavity at least partially encircled by at least one induction coil;
applying power to said at least one induction coil, said at least one induction coil functions as a heating device, a cooling device, or combinations thereof of said material; and,
using said at least one induction coil to at least partially maintain a constant temperature of said material in said material container for a period of time, to at least partially increase a temperature of said material in said material container of a period of time, to at least partially decrease a temperature of said material in said material container for a period of time, and to at least partially cause said material in said material container to be stirred for a period of time to control a cooling rate of said material in said material container.

32. The method as defined in claim 31, further including the steps of:
directly sensing, indirectly sensing, or combinations thereof of at least one electrical parameter as said power is applied to said at least one induction coil, said sensing of said at least one electrical parameter is obtained from one selected from the group consisting of i) feed from said at least one induction coil, ii) information from a solenoid coil in proximity to said at least one induction coil, and combinations thereof; and,
determining at least one selected from the group consisting of a load resistance inside a region at least partially encircled by said induction coil, a resistivity of said material, a temperature of said material, a solid fraction of said material, a liquid fraction of said material, and combinations thereof based at least partially on said sensed at least one electrical parameter.

33. A method of processing a metal alloy comprising:
a. providing a material container that includes a cavity, said cavity designed to receive a molten or semi-molten metal alloy;
b. providing an induction coil, said induction coil at least partially encircling said cavity of said material container;
c. inserting said molten or semi-molten metal alloy in said cavity;
d. one selected from the group consisting of increasing a temperature of said molten or semi-molten metal alloy in said cavity of said material container, decreasing a temperature said molten or semi-molten metal alloy in said cavity of said material container, and maintaining a temperature of said molten or semi-molten metal alloy in said cavity of said material container by controlling an amount of power applied to said induction coil;

e. stirring said molten or semi-molten metal alloy in said cavity of said material container by use of a magnetic field;

f. controllably cooling said molten or semi-molten metal alloy in said cavity of said material container by changing and controlling a power frequency to said induction coil;

g. directly sensing, indirectly sensing, or combinations thereof of at least one electrical parameter as said power is applied to said at least one induction coil, said sensing of said at least one electrical parameter is obtained from i) feedback from said at least one induction coil, ii) information from a solenoid coil in proximity to said at least one induction coil, or combinations thereof;

h. determining at least one selected from the group consisting of a load resistance inside a region at least partially encircled by said induction coil, a resistivity of said material, a temperature of said molten or semi-molten metal alloy, a solid fraction of said molten or semi-molten metal alloy, a liquid fraction of said molten or semi-molten metal alloy, and combinations thereof based at least partially on said sensed at least one electrical parameter; and;

i. depositing stirred and cooled metal alloy from said molten or semi-molten metal alloy in said cavity of said material container into a shot sleeve.

34. The method as defined in claim 33, including the step of maintaining a temperature of said molten or semi-molten metal alloy in said cavity of said material container after said molten or semi-molten metal alloy has reached a desired temperature, said desired temperature less than a temperature of said molten or semi-molten metal alloy when initially placed in said cavity of said material container.

* * * * *